US012589600B2

(12) United States Patent
Tang et al.

(10) Patent No.: US 12,589,600 B2
(45) Date of Patent: Mar. 31, 2026

(54) METHOD AND SYSTEM FOR PRINTING ON TILTED PRINT MEDIUM USING PRINTHEAD

(71) Applicant: GuangZhou KingTau Machinery&Electronics Equipment Co., Ltd., Guangdong (CN)

(72) Inventors: Zhenhua Tang, Guangdong (CN); Yilin Wan, Guangdong (CN)

(73) Assignee: GuangZhou KingTau Machinery&Electronics Equipment Co., Ltd., Guangzhou (CN)

( * ) Notice: Subject to any disclaimer, the term of this patent is extended or adjusted under 35 U.S.C. 154(b) by 266 days.

(21) Appl. No.: 18/154,733

(22) Filed: Jan. 13, 2023

(65) Prior Publication Data

US 2023/0150275 A1 May 18, 2023

Related U.S. Application Data

(63) Continuation of application No. PCT/CN2021/105844, filed on Jul. 12, 2021.

(30) Foreign Application Priority Data

Jul. 13, 2020 (CN) ......................... 202010669889.8
Aug. 12, 2020 (CN) ......................... 202010806525.X
Aug. 12, 2020 (CN) ......................... 202021676173.2

(51) Int. Cl.
*B41J 25/00* (2006.01)
*B41J 3/407* (2006.01)

(52) U.S. Cl.
CPC ............ *B41J 3/407* (2013.01); *B41J 25/003* (2013.01)

(58) Field of Classification Search
None
See application file for complete search history.

(56) References Cited

U.S. PATENT DOCUMENTS

2015/0036156 A1* 2/2015 Kondo .................... B41J 11/00 358/1.12
2017/0282549 A1* 10/2017 Arakane ............. B41J 2/04586

FOREIGN PATENT DOCUMENTS

CN 1596193 A 3/2005
CN 1757513 A 4/2006
(Continued)

*Primary Examiner* — Scott A Richmond
(74) *Attorney, Agent, or Firm* — MUNCY, GEISSLER, OLDS & LOWE, P.C.

(57) ABSTRACT

A method for printing on a tilted print medium using a first printing strategy or a second printing strategy. The first printing strategy includes: acquiring a tilted direction and a tilted angle of the titled print medium; acquiring a print start point; starting print from the start point and continuously translating the printhead toward the tilted opposite side in a direction perpendicular to the moving direction of the tilted print medium, and during the translation, controlling the inkjet hole to delay ink-jetting in the direction parallel to the moving direction of the tilted print medium. The second printing strategy includes: determining a tilted angle of the print medium and a position of a print standard point after tilted, adjusting the print content to be mirror symmetrical with the print medium, and controlling the printhead to print according to the print content when the print standard point reaches the printhead.

22 Claims, 5 Drawing Sheets

(56) References Cited

FOREIGN PATENT DOCUMENTS

| | | | |
|---|---|---|---|
| CN | 101151159 | A | 3/2008 |
| CN | 207617326 | U | 7/2018 |
| CN | 110341328 | A | 10/2019 |
| CN | 213353974 | U | 6/2021 |
| JP | 2017177454 | A | 10/2017 |
| JP | 2018047644 | A | 3/2018 |
| JP | 2018144429 | A | 9/2018 |

* cited by examiner

METHOD AND SYSTEM FOR PRINTING ON TILTED PRINT MEDIUM USING PRINTHEAD

CROSS REFERENCE TO RELATED APPLICATIONS

The present application is a continuation of International Application No. PCT/CN2021/105844, filed on Jul. 12, 2021, which claims priorities from Chinese Invention Application No. 202010669889.8 filed on Jul. 13, 2020, 202010806525.X filed on Aug. 12, 2020, and 202021676173.2 filed on Aug. 12, 2020, all of which are hereby incorporated herein by reference.

TECHNICAL FIELD

The present invention relates to the field of printing, more specifically, to a method and system for printing on a tilted print medium using a printhead.

BACKGROUND

In order to meet the aesthetic requirements of modern society, many products in the production process will be processed with the pattern to obtain ornamental end product. The more common pattern processing method is the manner of printing, in such way the product in the production line is transferred to the printhead to be printed, so that the product has basic patterns after passing through the printhead. As in the case of ceramic tiles, they are transferred to the printhead on the production line and started to be printed, and the formation of the pattern is basically completed after passing through the printhead. However, there are defects in the pattern processing process of such products in the prior art, especially in the printing process of tiles, i.e., when the medium to be printed occurs tilted, it is impossible to print a complete or non-deformed pattern onto the medium to be printed, which can easily lead to the rejection of the product. Because when the medium to be printed occurs tilted, the pattern formed by the printhead corresponding to the untilted medium to be printed does not match with the tilted medium to be printed, such that the product formed on the tilted medium shows a deformed pattern compared to other products; and when the distance between the pattern formed on the untilted medium and the medium edge to be printed is relatively small, printing on the tilted print medium may result in missing of patterns; e.g. a print pattern that is intended to present a square area on a ceramic tile may form a parallelogram with a missing section when the ceramic tile is tilted. Both of the foregoing cases lead directly to the rejection of the product, thus making production costs much higher.

In the prior art, the above-mentioned defects could only be overcome by manual adjustment normally. However, manual adjustment is not only time-consuming and easy to lead to a decrease in productivity, and accuracy of manual adjustment is also problematic, which may still lead to poor pattern printing, incomplete or deformed patterns after adjustment. Moreover, in consideration of production safety and technical confidentiality, etc., the process of moving the product to the printhead to be printed may also be relatively closed, providing no room for human manipulation during the production process, such that manual adjustment is also not very practical to overcome the above deficiencies. Therefore, there is an urgent need for a method and system for print on the tilted print medium, which can avoid the disadvantages, caused by manual adjustment, and can completely print a pattern on the tilted print medium without deformation to restore the original pattern.

SUMMARY

The present invention thus provides a method and system for printing on a tilted print medium using a printhead, which can print on the tilted print medium without manual adjustment, and the pattern formed by printing is complete and not deformed, reducing the possibility of rejected products, while also ensuring productivity and solving the problem of excessive time consumption and low productivity arising from handling and adjusting the tilted print medium.

According to the present invention, a method for printing on a tilted print medium using a printhead can be implemented by a first printing strategy or a second printing strategy.

In the first printing strategy, during printing the print medium can be moved relative to the printhead at speed $V_X$ and is printed when passing through the printhead. Multi-column linear print points perpendicular to a moving direction of the print medium are formed on the untilted print medium by the printhead, and the printhead is correspondingly provided with a plurality of inkjet holes to form the print points. Such method includes four Steps.

In Step S1, a tilted state of the tilted print medium is acquired, including a tilted direction and a tilted angle $\alpha$ relative to the moving direction.

The moving direction is the direction in which the print medium gradually approaches to the printhead relative to the printhead, i.e. the direction in which the print medium moves. The tilted direction includes the direction towards either side of the moving direction of the print medium, i.e., taking the end of the untilted print medium closest to the printhead as the tilted end, the opposite end as the reference end. When the distance of the tilted end relative to the reference end varies in the direction perpendicular to the moving direction of print medium, the print medium is tilted, and the current tilted direction is the direction of the side with increasing distance of the tilted end in the direction perpendicular to the moving direction of print medium compared to the reference end. Substantially, during the production process, because there is no external interference, tilting is usually relatively mild usually caused by mere shaking or small collisions. Take the example of a rectangular print medium placed on the conveyor belt, in this case, the two sides of the conveying direction of the conveyor belt are a first side and a second side, respectively, and the directions towards the first side and the second side from the conveyor belt in the direction perpendicular towards the moving direction of the print medium are taken as a first direction and a second direction, respectively. When the tilted end of the print medium is closer to the first side as compared to the reference end, the tilted direction of the print medium is the first direction at that moment. The tilted angle $\alpha$ is the angle between any straight line or edge on the untilted print medium parallel to the moving direction of the print medium and the moving direction when the print medium is tilted. It is easier to derive when the print medium is a rectangular structure. It is only necessary to derive the angle between the side-edge parallel to the moving direction without tilting and the moving direction when the print medium is tilted. The acquisition of the tilted direction and the tilted angle $\alpha$ of the tilted print medium may be achieved in many ways, such as by complex image recognition, by a thru-beam ranging sensor and calculation in combination with geometric relations. Acquiring the tilted direction and the tilted angle may help the printhead to print with specific printing strategies based on the tilted direction and the tilted angle.

In Step S2, a print start point $Z_0$ on the tilted print medium is acquired. That is to acquire the print area where the untilted print medium maps onto the tilted print medium, marking the print point closest to the printhead in the print area as the start point $Z_0$.

The printhead forms patterns in the print area on the untilted print medium. In order to have a substantially uniform effect when the tilted print medium has been printed, it is required to acquire the print area mapped onto the tilted print medium based on a distribution of a known print area on the untilted print medium. Since the print area and print medium size remain essentially the same for the same product, it is capable of deriving the print area of the tilted print medium based on the tilted direction and the tilted angle by applying geometric relationship. Based on the print area of the print medium, it is helpful to acquire the print point $Z_0$ closest to the printhead on the tilted print medium as the start point $Z_0$ for the ink-jetting. It is helpful to start printing upon the start point $Z_0$ enters the ink-jetting range of the printhead, thus preventing from missing the start point $Z_0$, missing part of the pattern, or a shift of the printing area, etc. The print point is a point formed by the ink-jetting of the printhead and is a virtual point before inkjet. The application is based on the print points for convenience of description. The starting point is actually a virtual point mapped on the tilted print medium closest to the printhead before ink-jetting, and able to be derived from the calculation of geometrical relationship, e.g. to print a square area, the starting point is a corner of the square area closest to the printhead after tilted.

In Step S3, the printhead is started to print from the start point $Z_0$, and is translated continuously, in the direction perpendicular to the moving direction of the tilted print medium towards the side of the tilted print medium opposite to the tilted side, and during translation, one or more inkjet holes is controlled to delay jetting ink, according to the tilted state of the tilted print medium, in the direction parallel to the moving direction of the tilted print medium.

The translation is a translation of the printhead relative to the print medium in the direction perpendicular to the moving direction of the tilted print medium. The printhead starts printing from the start point, as the print area on the tilted print medium is tilted compared to the print area on the untilted print medium, with the starting point taken as the origin point and continuously moving the printhead in a direction perpendicular to the moving direction of the print medium, it can allow at least printing one side corresponding to the print area. Moving towards the side of the tilted print medium opposite to the tilted side is that the printhead translates towards the direction opposite to the tilted direction. However, a single translation will only result in a deformed pattern, e.g. originally printing a square pattern on a rectangular untilted print medium, while translation enables one side of the print area mapped on the tilted print medium to be printed after the print medium has become tilted, the pattern formed by printing is shown as a parallelogram of a rectangular print medium with a missing part, a deformed and uncompleted pattern. Considering that each column of print points formed by printing on an untilted print medium, when the print medium is tilted, corresponding to each column of print points that should be formed is substantially also tilted, i.e., originally, the distances between the print points in the same column and the printhead in the direction of movement are equal, but after tilted, the distance between the print point in the same column and the printhead in the moving direction gradually increases in the tilted direction. In this case, the use of traditional inkjet with a column of inkjet holes at the same time to form a column of print points cannot solve the problem, however, the problem can be solved by controlling more than one inkjet hole in the direction parallel to a moving direction of the print medium to delay ink-jetting. Based on the tilted angle and mapped print area, more than one inkjet hole is set to delay ink-jetting, thus forming the tilted print points in columns which corresponds exactly to the tilted print medium, thereby restoring the effect of printing on the untilted print medium.

In Step S4, the printhead is continuously relatively translated until a complete pattern on the tilted print medium is formed, such pattern will not be deformed due to the tilted print medium. The printhead starts printing from the start point and continues to translate in the direction perpendicular to the moving direction of the print medium, and inkjet holes cooperate with the translation and delay ink-jetting one by one, accordingly it is able to print a tilted print area corresponding to a tilted print medium, i.e., the same effect is substantially achieved as printing on the untilted print medium, and the pattern is not deformed due to the tilted print medium. Further, due to forming multiple columns of tilted print points by the delayed ink-jetting during printing, thus it will not cause the inkjet hole to jet ink on the print medium, enabling the complete pattern substantially rendered on the tilted print medium.

By the above method it is not only possible to overcome the problem of not being able to print and form a product after the print medium becomes tilted during the production process in the prior art, but it also makes it possible to restore a substantially complete and undeformed pattern even on the tilted print medium, also without a manual adjustment of the print medium. It ensures production efficiency while reducing the possibility of the generation of the rejected products. Furthermore, according to this method, no complex mechanical structure is required to ensure the response speed of the printhead to achieve the accurate control of ink-jetting, and it can also avoid occupying a large space, making it easier to put into use in various production environments. In addition, the production process, the tilt usually shows a relatively small range of tilt, so that even if each inkjet hole for printing the untilted print medium is the same as the inkjet hole for printing the tilted print medium, in case of printing errors, it is able to render and restore the completed and undeformed pattern substantially. Furthermore, in fact, what the printhead forms when it prints a column is fundamentally a continuous line structure, further weakening the possible error of the pattern visually, i.e., with the method, it is even possible to directly use a conventional printhead in the prior art cooperated with the circuit control to complete printing on the tilted print medium, further reducing the cost of solving the above problem.

In the present invention, the printhead is connected to a translation driver, a time delay controller, and a control device. The translation driver is configured to driver the printhead to translate in a direction perpendicular to the moving direction of the print medium. The time delay controller is used to control the inkjet hole of the printhead to delay ink-jetting. The control device issues at least instructions to control the translation driver and the time delay controller.

The print medium is moved relative to the printhead at speed $V_X$ and is printed as passing through the printhead.

The printhead is translated in Step S3, continuously, with speed $V_Y$ relative to the tilted print medium in the direction perpendicular to the moving direction of the tilted print medium toward the side of the tilted print medium opposite to the tilted side. During translation, the plurality of inkjet holes forming a column of print points of the tilted print medium jet ink, from the inkjet holes closest to the side opposite to the tilted side and to the other side, in a sequential delay of Δt, i.e., the inkjet holes jet ink to form the same column of print points of the untilted print medium ink-jetting from the inkjet holes closest to the side opposite to the tilted side to t the tilted side in a sequential delay of Δt; $V_Y$ and Δt are set according to α. In the present invention, one of the time-delayed inkjet methods is that ink-jetting from the inkjet holes closest to the side opposite to the tilted side to the inkjet holes of the tilted side in a sequential delay of Δt enables ink-jetting of the inkjet holes on the corresponding columns in turn, thus achieving the pattern without deformation. Regarding the ink-jetting in a sequential delay of Δt, taking a column of inkjet holes arranged from up to down as an example, including the first, second, . . . , Nth inkjet hole, accordingly after the first inkjet hole ink-jets at the moment T, the second inkjet hole ink-jets in sequence with a delay following the ink-jetting of N1 at the moment T. The second inkjet hole ink-jets at the moment T+Δt, and the Nth inkjet hole ink-jets at the moment T+(N−1)Δt. N inkjet holes form a column of the tilted print points. More importantly, since the actual moving distance of the printhead and time to delay the ink-jetting in the direction opposite to the moving direction are dependent on the angle of the print medium after tilted, so in order to make the print pattern complete without deformation, $V_Y$ and Δt are set according to α.

According to the present invention, the print point closest to the printhead in any column of print points mapped on the tilted print medium is acquired and marked as point $A_1$ and the print point farthest from the point $A_1$ in the same column is marked as point $A_2$, the distance between the point $A_1$ and point $A_2$ in the direction perpendicular to the moving direction of the tilted print medium is marked as ω. The number of inkjet holes in each column correspondingly forming the same column of print points is marked as N, then $V_Y=V_X \tan \alpha$ and $$\Delta t = \frac{\omega \sin\alpha}{V_X(N-1)}.$$

Taking the example of printing a rectangular area, the inkjet hole $N_1$ corresponding to the print point of each column adjacent to the printhead in multiple inkjet holes corresponding to the print points formed by printhead is set as a benchmark, during translation thereof to ink-jet from the print point $Z_0$ closest to the printhead in the first column to the print point $A_1'$ closest to the printhead in the last column, the distance between $Z_0$ and $A_1'$ in the translating direction is $d_1$, and $d_1$=the length of the edge on the side corresponding to the print area $Z_0 \times \sin \alpha$; while in the moving direction of the print medium substantially moved a distance that is the length of the edge on the side corresponding to the print area×cos α, the time of the printhead translating from $Z_0$ to $A_1'$ is $$t_1 = \frac{\text{the length of the edge on the side corresponding to the print area } Z0 \times \cos\alpha}{V_X}, \text{ so } V_Y = \frac{d_1}{t_1} = V_X \tan\alpha.$$

In this case, the start point $Z_0$ in the first column of print points represents $A_1$, and the last point $Z_1$ in the first column of print points represents $A_2$, thereby compared to the ink-jetting of the inkjet hole corresponding to point $Z_0$, the ink-jetting of the inkjet hole corresponding to the point $Z_1$ need to be delayed by a time of $t_2$ to enable to correspond justly to the last print point in the print points in an untilted column. The distance between the point $A_1$ and point $A_2$ in the direction perpendicular to the moving direction of the tilted print medium is marked as ω. Since the distance between $Z_0$ and $Z_1$ in the moving direction of the print medium is $d_2=\omega \times \sin \alpha$, and $$t_2 = \frac{\omega \times \sin\alpha}{V_X}.$$

Meanwhile, since the print points are equidistant from each other, thus, after the N inkjet holes corresponding to $Z_0$ to $Z_1$ ink-jet from $Z_0$, they ink-jet in a sequential delay of Δt, so $$\Delta t = \frac{t_2}{N-1} = \frac{\omega \sin\alpha}{V_X(N-1)}.$$

Furthermore, since no other column printing points are involved, Δt can be acquired based on any column printing points $A_1$ and $A_2$.

In order to simplify the device, the printhead can be enabled to print on the tilted print medium with the inkjet holes in the same column as the print point of the untilted print medium, or, the inkjet holes can also be used with a differential spacing from the original printing of the untilted print medium to print the tilted print medium according to the rules specified in the above formula. Furthermore, The print points $A_1$ and $A_2$ of the first or last column are acquired to calculate and set $V_Y$ and Δt.

The printhead can includes multiple columns of inkjet holes with different spacing or the spacing between the inkjet holes in the printhead can be adjustable according to the present invention, marking the spacing between the adjacent inkjet holes in a plurality of inkjet holes forming a column of print points on the untilted print medium as L1, prior to S3, the time interval of the print points closest to the printhead in the adjacent column of print points of the tilted print medium printed by the printhead is set as ΔT'=ΔT cos α, the inkjet hole spacing or adjusting the inkjet hole spacing is selected as $L_1'=V_X\,\Delta T \sin \alpha+L_1 \cos \alpha$, wherein the ΔT is the ink jet interval for printing the print points in the adjacent columns on the untilted print medium.

When printing on the tilted print medium, the ink jet spacing $L_1$ and the ink jet interval ΔT for each print point in each column adjacent to the printhead are constant, basically no visually noticeable errors occurs under a smaller tilted angle; while in a case of a bigger tilted angle, there may be a case where the position to be printed is between the two print holes, the use of upward or downward the inkjet holes to print such point may cause visual errors at the edge of the pattern. In this case, it can be improved by increasing the accuracy of the printhead in the translating direction, such as reducing the spacing between the inkjet holes while increasing the number of inkjet holes to ensure the print width while reducing the error caused by the bigger tilted angle.

Furthermore, the printhead includes multiple columns of inkjet holes with different spacing $L_1$ between the adjacent inkjet holes or more than one column of inkjet holes with the spacing $L_1$ between the adjacent inkjet holes, which can also overcome the problem that an error occurs because the spacing of the adjacent print points does not correspond exactly to the inkjet holes in the moving direction of print medium as well as in the translating direction of the printhead after tilted. Taking a rectangular ceramic tile that needs to be completely covered by a pattern as an example, the printed points in the first column are marked as $Col_1$, the printed points in the second column are marked as $Col_2$, the print points closest to the printhead to the farthest away from the printhead in the same column are marked as $N_1$, $N_2$, . . . , $N_N$ in turn, consequently the distance between $Col_1$-$N_1$ and $Col_2$-$N_1$ is $l_1$, the distance between the both points is $l_2$, the tilted angle is α, as well as $l_1=V_X \Delta T$, then $l_1$ and $l_2$ are equal, the distance in the moving direction of the print medium of the printhead cooperating with the original print medium to move after ink-jetting $Col_1$-$N_1$ so as to print $Col_2$-$N_1$ is $l_1$, while after tilted, during the translation of the printhead to $Col_2$-$N_1$ after ink-jetting $Col_1$-$N_1$, the distance in the moving direction of the print medium is $l_2 \cos \alpha$, so $\Delta T'=\Delta T \cos \alpha$ due to $\Delta T' V_X = l_2 \cos \alpha$. In order to make the inkjet hole correspond to the print point and ink-jet it to achieve the reproduction pattern with a high precision, one of the options is that when the inkjet hole corresponding to $Col_1$-$N_1$ moves to $Col_2$-$N_1$, the former inkjet hole corresponding to $Col_1$-$N_2$ at untilted state is delayed to ink-jet until corresponding to $Col_1$-$N_2$ at tilted state, then the distance $L_1$ between the adjacent inkjet holes needs to equal to the distance in the moving direction of the printhead between $Col_1$-$N_2$ and $Col_2$-$N_1$, and $L_1'=V_X \Delta T' \tan \alpha + L_1 \cos \alpha = V_X \Delta T \sin \alpha + L_1 \cos \alpha$ is calculated and derived exploiting geometric relationships at the moment, where $L_1$ is the spacing between the adjacent inkjet holes in a plurality of inkjet holes forming a column of print points when former printing the untilted print medium. $Col_1$-$N_1$ is thus the start point closest to the printhead in the first column of print points closest to the printhead.

According to the present invention, on the tilted print medium the print point closest to the inkjet head in the last column of the print points corresponding to the untilted print medium is marked as a final reference point $A_1'$ and the print point in the same column farthest from the final reference point is marked as a tail point $A_2'$. In Step S3, the ink-jetting is started from the final reference point $A_1'$ when the printhead moves at speed $V_Y$ to print and form the print point of the column corresponding to the final reference point $A_1'$, the ink-jetting is started, by the remaining inkjet holes that together form the print point of the column corresponding to the final reference point $A_1'$, from the inkjet hole corresponding to the final reference point $A_1'$ with a sequential time delay of Δt, and is delayed until the inkjet hole of the final inkjet corresponds to the tail point $A_2'$ before completing printing. When not specifically stated below, a column of print points of the tilted print medium is a column of print points corresponding to the untilted print medium, i.e., the ink is jetted first at the inkjet hole closest to the tilted side of a column of inkjet holes, and the rest of the inkjet holes jet ink in a sequential delay. Also, when the printhead continues to translate at a constant speed to the start of printing the last column of print points, it is guaranteed that the ink is jetted from the final reference point, and delayed until the inkjet hole for the final inkjet corresponds to the final print point, consequently, the ink-jetting of the final column of the last tilted print point is completed, and the complete limitation of the print area from the start of printing to the completion of printing is completed, enabling that the distribution of patterns printed on the tilted print medium is the same compared to the tilted print medium as the distribution of patterns on the untilted print medium, thereby ensuring the completeness and non-deformation of the pattern. Actually, the final reference point and the tail point can be calculated and acquired from the known data incorporating geometric calculations, e.g., when the print area is a rectangle, in fact the final reference point and the tail point are the two angled points of the print medium away from the printhead, and easily calculated and acquired in combination with the known tilted angle α, print area size and distribution, thereby facilitating the calculation of the printhead translating speed and Δt to enable that the printing finally just ink-jets since the final reference point and the delayed ink-jetting ends at the end point. The delayed ink-jetting with a sequential time delay is that the ink-jetting is delayed towards the other end of the final reference point one by one after the remaining inkjet holes are started to ink-jet from the final reference point.

In the present invention, in Step S3, the printhead is moved until the inkjet hole for ink-jetting to the print point of the untilted print medium corresponding to the start point $Z_0$ corresponds, in the moving direction, thereof to the start point $Z_0$ of the tilted print medium before printing the start point $Z_0$. Since the start point serves as the closest print point to the printhead, and patterns generally have a variety of colors, in order to achieve the same printing effect and correspondence with the untilted print medium, the start point is enabled to be the same as the inkjet hole of the corresponding point on the untilted print medium, thereby facilitating the subsequent ink-jetting based on the same inkjet hole and reducing the complexity of the operation. The tilted print medium may also cause a change in position, hence the printhead moving firstly to that the corresponding inkjet hole corresponds to the start point in the moving direction may help the print medium to move into the print range to immediately start the printing, avoiding temporary alignment $Z_0$ and making full use of the gap time so as to improve printing efficiency.

The print point closest to the printhead in each column of print points mapping on the tilted print medium is marked as the reference point $A_1$, the inkjet hole for ink-jetting to the print point of the untilted print medium corresponding to the reference point $A_1$ is corresponded to the reference point $A_1$ one by one during the movement of the printhead at speed $V_Y$ in Step S3, i.e., in the process of translating and forming multiple columns of the print points, the printing starts each time from the print point in each column closest to the printhead, avoiding miss printing and enabling an accurate printing on the edge of one side of the print area, and making it easy to use the edge to provide a reference for the ink-jetting of other inkjet holes, which not only ensures the completeness of the pattern at the edge, but also helps reduce the difficulty of implementation, so that the other print holes according to specific rules to complete the printing of the entire print area.

According to the present invention, the print medium is placed on a conveyor and moves at a speed $V_X$ relative to the printhead. The printhead is further connected to a tilt detector provided for detecting a tilted state of the tilted print medium, a print point positioning module provided for acquiring a print start point $Z_0$ and a distance sensor provided for sensing the position of the tilted print medium relative to the printhead at a certain period or a certain moment before printing. The tilt detector is capable to be implemented using conventional sensors for measuring tilt in the prior art. The print point positioning module can be a device including a calculation module and a distance measurement module and can also be an image recognition device, which can acquire the position of the start point $Z_0$ by detecting the tilted direction, the tilted angle, the known distribution of the print area on the untilted print medium, together with geometric operations. The distance sensor can feedback the distance between the print medium and the printhead, so as to facilitate the calculation based on $V_X$ when the printhead will start to ink-jet downwards under the premise of alignment with $Z_0$ of the printhead in the moving direction of the print medium, contributing to the precise control of the ink-jetting, thus improving printing accuracy.

The print medium can be a ceramic tile. When the described tilt printing method is applied to a production line for ceramic tiles, it can avoid more rejected plates, which helps to reduce the loss due to rejected plates; besides, it can also automatically realize tilt printing of a ceramic tile without manual interference, which is more helpful to produce the ceramic tile in a relatively closed environment, to separate the whole production line, ant to enable the ceramic tile with less interference factors in the production process and produce the ceramic tile with better quality.

In the Step S2, the point $Z_0$ mapped on the tilted print medium is acquired according to the tilted angle $\alpha$ of the tilted print medium and the known distance of the print area relative to the edge of the untilted print medium. In addition, the point $Z_1$ in the same column print points as the point $Z_0$ and farthest from the point $Z_0$ is also acquired. Compared to acquiring the print points of other columns on the print medium, the points $Z_0$ and $Z_1$ are actually two corner points of the print area of the print medium, which are easily acquired based on the known distribution of the print area on the untilted print medium, thus facilitating the calculation and configuration of strategies for the movement of the printhead and ink-jetting of the inkjet holes.

The distance between the two print points mapped in the multiple print points on the tilted print medium and farthest apart in the translating direction of the printhead is marked as D, the tilted angle of the tilted the print medium in the present invention is less than or equal to a specific angle, such that D is less than or equal to the width of at least one column of inkjet holes of the printhead in the translating direction. When D is greater than the width of a column of inkjet holes in the direction perpendicular to the moving direction of the print medium will lead to a printing error, so the value of D cannot be greater than the width of a column of the inkjet holes in the translating direction, taking the above printing a rectangular area as an example, $D=d_1+\omega$. The printhead includes a plurality of inkjet heads, the inkjet holes are provided on the inkjet heads, a plurality of inkjet heads and corresponding inkjet holes thereof form more than one column of inkjet holes on the printhead. Furthermore, the printhead, based on the required width of the untilted print medium, at the both ends of the translating direction are provided with more than one inkjet head, i.e., the both ends are provided with the width of more than one inkjet head for printing the tilted print medium, taking the printing of rectangular patterns as an example, after the print medium tilts, d1 is equal to the length of the edge on the side corresponding to the print area $Z_0 \times \sin \alpha$ and should be less than the width of one inkjet head. When the printhead is composed of 1536 inkjet heads, the 1536 inkjet heads, in the direction perpendicular to the moving direction of the print medium, has a width of 70 mm, i.e., the tilted angle of the tilted print medium should be less than a specific angle, allowing $d_1 \leq 70$ mm.

According to one embodiment of the present invention, the width of the print area on the untilted the print medium in the moving direction closest to the one side of the printhead is greater than or equal to that of the side away from the printhead. Compared to the other print areas where the width in the middle is greater than that of the sides, the control of the print hole of the printhead in such configuration is simple, thereby helping simplify the control circuit, e.g., a rectangle, a square, and a trapezoid that gradually becomes narrower in the direction away from the printhead.

The print medium is preferably a rectangular print medium. When the print medium is a rectangular print medium, it is useful to calculate, based on the regular print medium, the distribution of the print area mapped on the tilted print medium, and when the print area covers the entire print medium, the tilted angle, tilted direction of the print medium are acquired by only a simple rangefinder combined with geometric calculations.

The print area of the untilted print medium is also preferably a rectangular print area. It is also convenient to combine its distance from the print medium border to acquire the distribution mapped on the tilted print medium.

The second printing strategy according to the present invention includes: determining a tilted angle of the print medium and a position of a print standard point after tilted, adjusting a print content according to the tilted angle and the position of the print standard point to make the print content mirror symmetrical with the print medium; and controlling the printhead to start printing on the print medium according to the print content when the print standard point is conveyed to the printhead.

During normal conveyance of the print medium, when it is conveyed to the printhead, the printhead forms a pattern or color on the print medium according to the preset print content, the print content is generally a pattern or design set etc. in the software. When the print medium is tilted, the print content needs to be adjusted accordingly so that the print medium can be printed properly and the printed pattern will not be missing or tilted. The print content adjustment depends on the state of the print medium after tilted, therefore it needs to acquire the tilted angle and print standard point of the print medium after tilted before the print medium is conveyed to the printhead, the print content thus can be adjusted based on the tilted angle and the print standard point. In general, the print content firstly rotates a same angle according to the tilted angle, and then take the print standard point as the reference point for adjusting the position to adjust the print content to the position corresponding to the print standard point, such that the print medium will be mirror symmetrical with the print content; and when the print medium reaches the printhead, the printhead can print on the print medium according to the adjusted print content to complete the print of the tilted print medium. The method provided by the present invention only requires calculation or measurement to acquire the tilted state of the print medium, by adjusting the print content corresponding to the tilted print medium, the printing of the tilted print medium can be completed smoothly, and the entire adjustment process is not a manual adjustment, with high efficiency and low cost.

The tilted angle is an angle between one edge of the print medium and a reference line, and the one edge of the print medium corresponding to the tilted angle is the angled edge of the print medium; the reference line is a straight line parallel to the direction in which the print medium is conveyed. The determining a tilted angle of the print medium is specified by: when satisfying the condition Sc1, measuring the vertical distances $y_2$ and $y_3$ from the points $D_2$ and $D_3$ on the reference line to the angled edge of the print medium, respectively, determining the tilted angle of the print medium according to the horizontal coordinate $x_2$ of the point $D_2$, the horizontal coordinate $x_3$ of the point $D_3$, $y_2$ and $y_3$.

The tilted angle of the print medium is an angle between a reference line and one side of the print medium, the reference line may be a straight line parallel to the conveying direction of the print medium. The tilted angle is determined in the specific manner of: when the condition Sc1 is triggered, measuring the vertical distances $y_2$ and $y_3$ from the points $D_2$ and $D_3$ on the reference line to the angled edge of the print medium, respectively, wherein there are two crossing points with the angled edge of the print medium, taking the points $D_2$ and $D_3$ as endpoints, perpendicular to the reference line, the two crossing points are generally not the two endpoints of the angled edge; acquiring the coordinates of the two crossing points based on the measured vertical distances $y_2$ and $y_3$ combined with the horizontal coordinates $x_2$ of the point $D_2$ and the horizontal coordinates $x_3$ of the point $D_3$, calculating the tilted angle of the print medium according to the coordinates of the two crossing points.

The condition Sc1 can be that the horizontal coordinate of the print standard point is x1. The print medium is preferably of a rectangular shape.

The method of determining a position of a print standard point after tilted is specified by: when the print medium is tilted in a clockwise direction, determining the position of the print standard point after tilted according to $x_1$, $x_2$, $x_3$, $y_2$, $y_3$ and the length of the edge of the print medium perpendicular to the angled edge; when the print medium is tilted in a counterclockwise direction, determining the position of the print standard point after tilted according to $x_1$, $x_2$, $x_3$, $y_2$, $y_3$.

When the horizontal coordinates of the print standard point satisfy $x_1$, i.e., triggering condition Sc1, due to the reference point for adjusting the print content defined by the position of the print standard point, the handling of the tilted print medium requires determining the horizontal and vertical coordinates of the print standard point to determine the position of the print standard point at a certain moment. As the horizontal coordinate of the print standard point at that moment is known to be $x_1$, the vertical coordinate of the print standard point can be determined as follows: when the print medium is tilted in a clockwise direction, the longitudinal coordinates of the print standard point after tilted can be determined from the horizontal coordinate $x_1$, the horizontal coordinate $x_2$ of the point $D_2$, the horizontal coordinate $x_3$ of the point $D_3$, the vertical distance $y_2$ from the point $D_2$ to the angled edge, the vertical distance $y_3$ from the point $D_3$ to the angled edge, and the length of the edge of the print medium perpendicular to the angled edge; when the print medium is tilted in the counterclockwise direction, the longitudinal coordinates of the print standard point after tilted can be determined from the horizontal coordinate $x_1$, the horizontal coordinate $x_2$ of the point $D_2$, the horizontal coordinate $x_3$ of the point $D_3$, the vertical distance $y_2$ from the point $D_2$ to the angled edge, and the vertical distance $y_3$ from the point $D_3$ to the angled edge.

The angled edge is the long edge of the print medium closest to the reference line. The method of determining a tilted angle of the print medium according to the horizontal coordinate $x_2$ of the point $D_2$, the horizontal coordinate $x_3$ of the point $D_3$, $y_2$ and $y_3$ is specified by: determining the tilted angle according to relationship formula $$\tan\theta = \frac{y_2 - y_3}{x_3 - x_2}$$

when the print medium is tilted in a clockwise direction; determining the tilted angle according to relationship formula $$\tan\theta = \frac{y_3 - y_2}{x_3 - x_2}$$

when the print medium is tilted in a counterclockwise direction; wherein, θ is the tilted angle, $x_2$ and $x_3$ meet x3>x2.

Furthermore, when the print medium is tilted in a clockwise direction, the method of determining the position of the print standard point after tilted according to $x_1$, $x_2$, $x_3$, $y_2$, $y_3$ and the length of the edge of the print medium perpendicular to the angled edge, is specified by: when the print medium is tilted in a clockwise direction, determining the position of the print standard point after the print medium is tilted according to $$y_1 = \left(y_3 + \frac{b}{\cos\theta}\right) - (x_3 - x_1) \times \tan\theta;$$

when the print medium is tilted in a counterclockwise direction, the method of determining the position of the print standard point after tilted according to $x_1$, $x_2$, $x_3$, $y_2$, $y_3$, is specified by: when the print medium is tilted in a counterclockwise direction, determining the position of the print standard point after the print medium is tilted according to $y_1 = y_2 + (x_1 - x_2) \times \tan\theta$;

wherein, $y_1$ is the vertical height of the print standard point to the reference line, b is the length of the short edge of the print medium, $x_1$, $x_2$ and $x_3$ meet $x_1 > x_3 > x_2$.

The present invention also aims to provide a system for printing on a tilted print medium using a printhead, including a first device module combination and/or a second device module combination.

The first device module combination may be used to implement the first printing strategy described above and includes:

a printhead, where a print medium is moved relative to the printhead and printed when passing through the printhead, the printhead being provided with a plurality of inkjet holes, which print on the untilted print medium to form multi-column linear print points;

a tilt detector, for detecting parameters including a tilted direction and a tilted angle α of the tilted print medium relative to a moving direction of the print medium which reflect a tilted state of the print medium;

a translating driver, for driving the printhead to translate in a direction perpendicular to the moving direction of print medium;

a time delay controller connected to the printhead, for controlling to delay ink-jetting of the inkjet holes of the printhead; and a control device, including a print point positioning module for at least acquiring a print point $Z_0$ closest to the printhead in the moving direction of the tilted print medium as the start point for ink-jetting, the control device being connected to the tilt detector, the translating driver and the time delay controller. The printhead is controlled to translate by the translating driver and one or more of inkjet holes in the printhead is controlled to delay ink-jetting by the time delay controller.

The control device is configured to control, according to the data acquired by the tilt detector and print point positioning module, the translating driver to drive the printhead continuous translation to the tilted opposite side after ink-jetting from the start point, and meanwhile controls more than one of the multiple inkjet holes on the printhead, through the time delay controller, to print and form a column of print points of the untilted print medium to delay ink-jetting. The printhead is continuously translated and prints simultaneously until the complete pattern is printed on the tilted print medium and the pattern is not deformed due to the tilting.

The tilt detector device includes an image recognition device or a ranging sensor, the tilted direction and the tilted angle can be calculated by the ranging sensor combined with geometric relationship, for example, to acquire the upper surface of the rectangular print medium to be completely covered by the pattern, the ranging sensor acquires the distance between one side of the print medium and the sensor at the first moment and that at the second moment, combined with the moving speed of the print medium to calculate and acquire the tilted direction and the tilted angle. Acquiring the tilted direction and the tilted angle can help subsequently the printhead to print with a specific printing strategy based on the tilted direction and the tilted angle.

The printhead forms a pattern in the print area of the untilted print medium, in order to make the tilted print medium to have basically the same effect after being printed, it is necessary to acquire the print area mapped on the tilted print medium based on the known distribution of the print area of the untilted print medium, and due to the same product print area and the print medium size generally unchanged, the printing area of the tilted print medium can be acquired based on geometric relationship with the tilted direction and the tilted angle, and it also helps to acquire the print point $Z_0$ closest to the printhead in the print area of the tilted print medium based on the print area thereof, which helps to start printing immediately when the start point $Z_0$ enters the ink-jetting range of the printhead, preventing such situations as missing the start point $Z_0$, missing part of the pattern or offsetting of the print area. The print point positioning module can acquire by such way above the start point $Z_0$. The print point is a point formed by ink-jetting of the printhead, and is a virtual point before ink-jetting; the present application is based on the print points for easy description. The start point is actually a virtual point closest to the printhead mapped on the tilted the print medium before ink-jetting, and can be calculated and acquired through geometric relationships, such as, to print a square area, the start point is a corner point of the square area closest to the printhead after tilted.

The translation controlled by the translating driver is a translation of the printhead in the direction perpendicular to the moving direction of the print medium relative to the print medium. The printhead starts printing from the start point, at this moment the print area on the tilted print medium is tilted compared to the print area on the untilted print medium, so that the start point is used as the print point and the printhead is continuously moved in a direction perpendicular to the moving direction of the print medium, enabling at least one side corresponding to the print area to be printed. The moving towards the tilted opposite side is a translation of the printhead in the direction opposite to the tilted direction. However, the translation alone will only result in a deformation of the pattern, such as originally printing a square pattern on a rectangular untilted print medium, after the print medium is tilted, although the translation can make the print area mapped on the tilted print medium print, but the printed pattern is shown as a parallelogram of a rectangular print medium with missing part. The pattern is deformed and uncompleted. Considering that, each column of print points, that should be formed corresponding to each column of print points printed and formed on the untilted print medium when the print medium is tilted, occurs tilting in fact, i.e., originally the distance between the same column of print points and the printhead in the moving direction is equal, after tilted, the distance between the same column of print points and the printhead in the moving direction becomes into a gradual increase in the tilting direction. In this case, the problem cannot be solved by using the traditional way of forming a column of print points by ink-jetting via a column of holes at the same time, while the problem can be solved by time delay controller to control more than one inkjet hole in the direction parallel to the moving direction of the print medium to delay ink-jetting. More than one inkjet hole is set to delay ink-jetting based on the tilted angle and the mapped print area, hereby forming the tilted print points column by column, just corresponding to the tilted print medium, so as to restore the effect of printing on the untilted print medium.

The printhead continuously translates in the direction perpendicular to the moving direction of the print medium after starting the printing from the start point, the inkjet hole cooperates with the translation and delays the ink-jetting one by one, by such way the tilted print area can be printed corresponding to the tilted print medium, thus the same print effect is basically achieved as that printed on the untilted print medium, the pattern is not deformed due to the tilt of the print medium.

Furthermore, the print medium is moved relative to the printhead at speed $V_X$ and is printed as passing through the printhead, the translating driver controls the printhead to translate continuously at speed $V_Y$ relative to the tilted print medium in the direction perpendicular to the moving direction of the tilted print medium toward the tilted opposite side, the time delay controller at least controls a plurality of inkjet holes of the printhead forming a column of print points to ink-jet from the inkjet holes at one end and then to inkjet holes at the other end with a sequential time delay of $\Delta t$, i.e., a plurality of inkjet holes forming a column of print points of the tilted print medium ink-jet from the inkjet holes closest to the end of the side opposite to the tilted side and then ink-jet to the other end with a sequential time delay of $\Delta t$; $V_Y$ and $\Delta t$ are set according a.

Furthermore, the print point positioning module cooperates with the tilt detector to detect data and a distribution of a known print area on the untilted print medium to acquire two terminal print points in a column of print points and the distance ω between the two terminal print points in the direction perpendicular to the moving direction of the print medium, the control device acquires the number N of inkjet holes corresponding to the column of print points and sets $V_Y = V_X \tan\alpha$ and $$\Delta t = \frac{\omega \sin\alpha}{V_X (N-1)}.$$

In order to simplify the device, the printhead may be made to print on the tilted print medium with the inkjet hole that prints the same column of print points on the untilted print medium. Or, the tilted print medium can also be printed in accordance with the rules specified in the above formula using the inkjet hole with a different spacing from originally printing the untilted print medium. Furthermore, the points $A_1$ and $A_2$ of the first or last column are acquired to calculate and set $V_Y$ and Δt.

The printhead can include multiple columns of inkjet holes with different spacing or the spacing between inkjet holes in printhead is adjustable, the spacing between adjacent inkjet holes in a plurality of inkjet holes forming a column of print points on the untilted print medium is marked as $L_1$, the control device, according to the data acquired by the tilt detector and the print point positioning module, sets the time interval of the print points closest to the printhead in the adjacent column of print points of the tilted print medium printed by the printhead as $\Delta T'=\Delta T \cos \alpha$ and selects the inkjet hole spacing or adjusts the inkjet hole spacing as $L_1'=V_X \Delta T \sin \alpha+L_1 \cos \alpha$, wherein the ΔT is the inkjet interval for printing the print points in adjacent columns of the untilted print medium.

The print point positioning module acquires the print point closest to the printhead on the tilted print medium according to the data and the distribution of the known print area on the untilted print medium acquired by the print point positioning module. For example, the tilt detector is able to acquire the first moment of sudden change of the distance, and the second and third moments of continuous change of the distance. The first moment is the time when the print medium reaches the position of the tilt detector, and the tilted angle and tilted direction can be acquired by combining the distance measurement results at the second and third moments, the time interval and $V_X$. Meanwhile, the print point positioning module calculates the distance that the print medium moves from the first moment to the third moment, and calculates the print area mapped on the tilted print medium by combining the data detected by the tilt detector and the distribution of the print area on the untilted print medium, so as to acquire the start point $Z_0$ for ink-jetting.

The control device controls the printhead by the translating driver to translate to match with the start point according to the data acquired by the print point positioning module. As the start point as the print point closest to the printhead, and a general pattern has a variety of colors, in order to achieve the same printing effect and correspondence with the untilted print medium, and to enable the start point the same as the inkjet hole of the corresponding point on the untilted print medium, so as to facilitate subsequently the ink-jetting based on the same inkjet hole, thereby reducing the complexity of the operation. Furthermore, the tilted print medium may also cause position changes, the tilted print medium may also produce position changes, therefore in the present invention, after acquiring the start point by the print point positioning module, the printhead is driven by the translating driver to translate to where the corresponding inkjet hole corresponds to the start point in the moving direction, which helps the print medium to move into the printing range and then immediately start printing, thereby avoiding temporary positioning $Z_0$, and making full use of the gap time to improve printing efficiency.

In the present invention, the print point closest to the inkjet head in the last column of the print points corresponding to the untilted print medium on the tilted print medium is marked as a final reference point $A_1'$ and the print point in the same column as the final reference point $A_1'$ and farthest from the final reference point as a tail point $A_2'$. The print point positioning module acquires the final reference point $A_1'$ and the tail point $A_2'$. The ink-jetting is started from the final reference point $A_1'$ when the printhead moves controlled by the control device at speed $V_Y$ to print and form the print point of the column corresponding to the final reference point $A_1'$, the ink-jetting is started, by the remaining inkjet holes that together form the print point of the column corresponding to the final reference point $A_1'$, from the inkjet hole corresponding to the final reference point $A_1'$ with a sequential time delay of Δt, and is delayed until the inkjet hole of the final inkjet corresponds to the tail point $A_2'$ before completing print. When not specifically stated below, a column of print points of the tilted print medium is a column of print points corresponding to the untilted print medium, i.e., the ink is jetted first at the inkjet hole closest to the tilted side of a column of inkjet holes, and the rest of the inkjet holes ink-jet in a sequential delay. Also, when the printhead continues to translate at a constant speed to the starting of printing the last column of print points, it is guaranteed that the ink is jetted from the final reference point, and delayed until the inkjet hole for the final inkjet corresponds to the final print point, consequently, the ink-jetting of the final column of the last tilted print point is completed, and the complete limitation of the print area from the start of printing to the completion of printing is completed, enabling that the distribution of patterns printed on the tilted print medium is the same compared to the tilted print medium as the distribution of patterns on the untilted print medium, thereby ensuring the completeness and non-deformation of the pattern. Actually, the final reference point and the tail point can be calculated and acquired from the known data incorporating geometric calculations, e.g., when the print area is a rectangle, in fact the final reference point and the tail point are the two angled points of the print medium away from the printhead, and easily calculated and acquired in combination with the known tilted angle α, print area size and distribution, thereby facilitating the calculation of the printhead translating speed and Δt to enable that the printing finally just ink-jets since the final reference point and the delayed the ink-jetting ends at the end point. The delayed ink-jetting with a sequential time delay is that the ink-jetting is delayed towards the other end of the final reference point one by one after the remaining inkjet holes are started to ink-jet from the final reference point.

The print point positioning module marks the print point closest to the printhead in each column of print points on the tilted print medium, calculated and acquired according to the distribution of a known print area on the untilted print medium and $V_X$, as the reference point $A_1$, the inkjet hole for ink-jetting to the print point of the untilted print medium corresponding to the reference point $A_1$ is corresponded to the reference point $A_1$ one by one during the movement of the printhead controlled by the control device at speed $V_Y$, i.e., in the process of translating and forming multiple columns of the print points, the printing starts each time from the print point in each column closest to the printhead, avoiding miss printing and enabling an accurate printing on the edge of one side of the print area, and making it easy to use the edge to provide a reference for the ink-jetting of other inkjet holes, which not only ensures the completeness of the pattern at the edge, but also helps reduce the difficulty of implementation, so that other print holes according to specific rules to complete the printing of the entire print area.

The tilt detector includes more than one thru-beam ranging sensor arranged in the moving direction of the print medium. With the thru-beam ranging sensor, in addition to facilitating the detection of the tilted direction and the tilted angle, it also helps to detect the print medium position instantly, so as to provide a ground for data for the print point positioning module. For example, when the print medium is moved to obscure the contra-range sensor, the print point location module can calculate to position the start point $Z_0$ in combination with the tilted direction, tilted angle acquired subsequently, the distribution of the known print area of the untilted print medium and $V_X$. Furthermore, the print medium is a ceramic tile.

The print point positioning module acquires the start point $Z_0$, the print point $Z_1$ in the same column print points as the point $Z_0$ and farthest from the start point, and the distance between the two points, i.e., to get the points on both ends of the edge of the print area to facilitate the calculation of the print point positioning module. Compared to acquiring the print points of other columns on the print medium, the points $Z_0$ and $Z_1$ are actually the two corner points of the print area of the print medium, which are easily acquired based on the distribution of the known print area on the untilted print medium, thus facilitating the calculation and configuration of strategies for the printhead movement and ink-jetting of the inkjet holes.

The distance between the two print points mapped in the multiple print points on the tilted print medium and farthest apart in the translating direction of printhead is marked as D, the tilted angle of the tilted the print medium is less than or equal to a specific angle, such that D is less than or equal to the width of at least one column of inkjet holes of the printhead in the translating direction. When D is greater than the width of a column of inkjet holes in the direction perpendicular to the moving direction of the print medium will lead to a printing error, so the value of D cannot be greater than the width of a column of the inkjet holes in the translating direction, taking the above printing a rectangular area as an example, $D=d_1+\omega$. The printhead includes a plurality of inkjet heads, the inkjet holes are provided on the inkjet heads, a plurality of inkjet heads and corresponding inkjet holes thereof form more than one column of inkjet holes on the printhead. Furthermore, the printhead, based on the required width of the untilted print medium, at both ends of the translating direction are provided with more than one inkjet head, i.e., the both ends are provided with the width of more than one inkjet head for printing the tilted print medium, taking the printing of a rectangular pattern as an example, after the print medium tilts, $d_1$ is equal to the length of the edge on the side corresponding to the print area $Z_0 \times \sin \alpha$ and should be less than the width of one inkjet head. When the printhead is composed of 1536 inkjet heads, the 1536 inkjet heads, in the direction perpendicular to the moving direction of the print medium, has a width of 70 mm, i.e., the tilted angle of the tilted the print medium should be less than a specific angle, allowing $d_1 \leq 70$ mm.

According to the present invention, the width of the print area on the untilted the print medium in the moving direction closest to the one side of the printhead is greater than or equal to that of the side away from the printhead. Furthermore, the print medium is a rectangular print medium. Furthermore, the print area of the untilted print medium is a rectangular print area.

The system further includes a distance sensor connected to the control device and sensing the position of the tilted print medium relative to the printhead at a certain period or a certain moment before printing. The distance sensor can feedback the distance between the print medium and the printhead, so as to facilitate the calculation based on $V_X$ when the printhead will start to ink-jet downwards under the premise of alignment with $Z_0$ of the printhead in the moving direction of the print medium, contributing to the precise control of the ink-jetting, thus improving printing accuracy.

The second device module combination may be used to implement the second printing strategy described above and includes: a control module and a data processing module.

The data processing module is used to determine a tilted angle of the print medium and a position of a print standard point after tilted. The control module is used to adjust a print content according to the tilted angle and the position of the print standard point determined by the data processing module to make the print content mirror symmetrical with the print medium. The control module is also used to control the printhead to start printing on the print medium according to the print content when the print standard point is conveyed to the printhead.

During normal conveyance of the print medium, when it is conveyed to the printhead, the control module of the system controls the printhead to form a pattern or color on the print medium according to the preset print content, the print content is generally a pattern or design set etc. in the software. When the print medium is tilted, the print content needs to be adjusted accordingly so that the print medium can be printed properly and the printed pattern will not be missing or tilted.

The print content adjustment depends on the state of the print medium after tilted, therefore the data processing module of the system needs to acquire the tilted angle and print standard point of the print medium after tilted before the print medium is conveyed to the printhead, so the print content can be adjusted based on the tilted angle and the print standard point. In general, the data processing module will firstly rotate the print medium by a same angle according to the tilted angle, and then take the print standard point as the reference point for adjusting the position to adjust the print content to the position corresponding to the print standard point, such that the print medium will be mirror symmetrical with the print content; and when the print medium reaches the printhead, the printhead can be controlled to print on the print medium according to the adjusted print content to complete the print of the tilted print medium. The method provided by the present invention only requires the data processing module to calculate or measure so as to acquire the tilted state of the print medium, consequently adjusting cooperated with the control module the print content to correspond to the tilted print medium, the printing of the tilted print medium can be completed smoothly, and the entire adjustment process is not a manual adjustment, with high efficiency and low cost.

The tilted angle is an angle between one edge of the print medium and a reference line, the one edge of the print medium corresponding to the tilted angle is the angled edge of the print medium. The reference line is a straight line parallel to the direction in which the print medium is conveyed. The data processing module includes a data computing module, and a data detecting and measuring module. The data processing module is used to determine the tilted angle of the print medium, specified by: the data detecting and measuring module used to detect whether the condition Sc1 is satisfied or not, and when satisfying the condition Sc1, measuring vertical distances $y_2$ and $y_3$ from the points $D_2$ and $D_3$ on the reference line to the angled edge of the print medium, respectively; the data computing module used to determine the tilted angle of the print medium according to the horizontal coordinate $x_2$ of the point $D_2$, the horizontal coordinate $x_3$ of the point $D_3$, $y_2$ and $y_3$.

The condition Sc1 can be that the horizontal coordinate of the print standard point is $x_1$. The print medium is of a rectangular shape. The data processing module is used to determine the position of the print standard point after tilted, specified by: the data computing module used to determine the position of the print standard point after tilted according to $x_1$, $x_2$, $x_3$, $y_2$, $y_3$ and the length of the edge of the print medium perpendicular to the angled edge when the print medium is tilted in a clockwise direction; and used to determine the position of the print standard point after tilted according to $x_1$, $x_2$, $x_3$, $y_2$, $y_3$ when the print medium is tilted in a counterclockwise direction.

The data detecting and measuring module includes an obstruction sensor, a first distance sensor and a second distance sensor, the data detecting and measuring module used to detect whether the condition Sc1 is satisfied or not, and when satisfying the condition Sc1, measuring the vertical distances $y_2$ and $y_3$ from the points $D_2$ and $D_3$ on the reference line to the angled edge of the print medium, respectively, specified by: the obstruction sensor is used to detect whether the condition Sc1 is satisfied or not. The first distance sensor is used to measure the vertical distance $y_2$ from points $D_2$ on the reference line to the angled edge of the print medium when the obstruction sensor determines that the condition Sc1 is satisfied, and the second distance sensor is used to measure the vertical distance $y_3$ from the points $D_3$ on the reference line to the angled edge of the print medium when the obstruction sensor determines that the condition Sc1 is satisfied.

The data detection measurement module may be realized by the three sensors, wherein, the obstruction sensor is used to detect whether the condition Sc1 is satisfied or not: the obstruction sensor is configured at the position of the horizontal coordinate $x_1$ on the reference line and detects the presence of an item on the straight line with the horizontal coordinate $x_1$. When the print standard point obscures the straight line with the horizontal coordinate $x_1$, the obstruction sensor detects the obstruction and determines that the condition Sc1 is satisfied. Secondly, the distances from the points $D_2$ and $D_3$ to the angled edge are measured by the two distance sensors respectively; the first distance sensor is arranged at the position of the horizontal coordinate $x_2$ on the reference line, i.e. the position of the point $D_2$, and the second distance sensor is arranged at the position of the horizontal coordinate $x_3$ on the reference line, i.e. the position of the point $D_3$; when the obstruction sensor determines that the condition Sc1 is satisfied; the two distance sensors measure the vertical distances $y_2$ and $y_3$ from each sensor to the angled edge, the data measured are combined with the horizontal coordinates of each sensor to derive the exact horizontal and vertical coordinates of the print standard point.

Furthermore, the angled edge is the long edge of the print medium closest to the reference line; the data computing module is used to determine the tilted angle of the print medium according to the horizontal coordinate $x_2$ of the point $D_2$, the horizontal coordinate $x_3$ of the point $D_3$, $y_2$ and $y_3$, specified by: determining the tilted angle according to relationship formula $$\tan\theta = \frac{y_2 - y_3}{x_3 - x_2}$$

when the print medium is tilted in a clockwise direction; determining the tilted angle according to relationship formula $$\tan\theta = \frac{y_3 - y_2}{x_3 - x_2}$$

when the print medium is tilted in a counterclockwise direction; and the data computing module is used to determine the position of the print standard point after tilted according to $x_1$, $x_2$, $x_3$, $y_2$, $y_3$ and the length of the edge of the print medium perpendicular to the angled edge when the print medium is tilted in a clockwise direction, specified by: the data computing module used to, when the print medium is tilted in a clockwise direction, determine the position of the print standard point after the print medium is tilted according to $$y_1 = \left(y_3 + \frac{b}{\cos\theta}\right) - (x_3 - x_1) \times \tan\theta;$$

the data computing module is used to, when the print medium is tilted in a counterclockwise direction, determine the position of the print standard point after tilted according to $x_1$, $x_2$, $x_3$, $y_2$, $y_3$, specified by: the data computing module used to, when the print medium is tilted in a counterclockwise direction, determine the position of the print standard point after the print medium is tilted according to $y_1=y_2+(x_1-x_2)\times\tan\theta$;

wherein, $\theta$ is the tilted angle, $y_2$ and $y_3$ are the data acquired by the data detecting and measuring module; $x_1$ is the horizontal coordinate satisfied in the condition Sc1, $x_2$ is the horizontal coordinate of the point $D_2$, $x_3$ is the horizontal coordinate of the point $D_3$; $y_1$ is the vertical height of the print standard point to the reference line, b is the length of the short edge of the print medium, $x_1$, $x_2$ and $x_3$ meet $x_1>x_3>x_2$.

Compared with the prior art, the present invention has the beneficial effect of being able to automatically adjust the printing strategy for the tilted print medium. Even if the print medium occurs tilted, it can restore basically the same print effect on the tilted print medium as that on the untilted print medium, avoiding more rejected products due to incomplete printing and pattern deformation, fully utilizing the existing material and improving the yield rate. Compared with the manual adjustment in the prior art, it significantly improves the production efficiency and does not waste production time due to manual interference; at the same time, the present invention can achieve the corresponding function using the common printhead in the prior art without changing the mechanical structure, avoiding the complexity of redesigning the printhead, and also achieving more accurate printing by utilizing the printhead with multiple columns or variable spacing, further improving the quality of the pattern printed on the tilted print medium while ensuring the basic restoration of the pattern. When the present invention is applied to products with more regular dimensions such as ceramic tiles, it not only facilitates quick calculations and simplifies the process, but also facilitates the independence of the production process of such print medium from other interfering factors, such as the original manual interference in the prior art, thus improving the quality of the corresponding end product. In particular, the second printing strategy of the present invention, for the combination of device modules, only after calculating or measuring to acquire the tilted state of the print medium, by adjusting the print content accordingly, the printing of the tilted print medium can be completed smoothly, and the entire adjustment process is non-manual, efficient and cost-effective.

DETAILED DESCRIPTION OF THE INVENTION

The accompanying drawings of the present invention are for exemplary illustration only and are not to be interpreted as limiting the present invention. In order to better illustrate the following embodiments, certain parts of the accompanying drawings are omitted, enlarged or reduced and do not represent the dimensions of the actual product; it is understandable to those skilled in the art that certain well-known structures and their descriptions may be omitted from the accompanying drawings.

Figure 1:
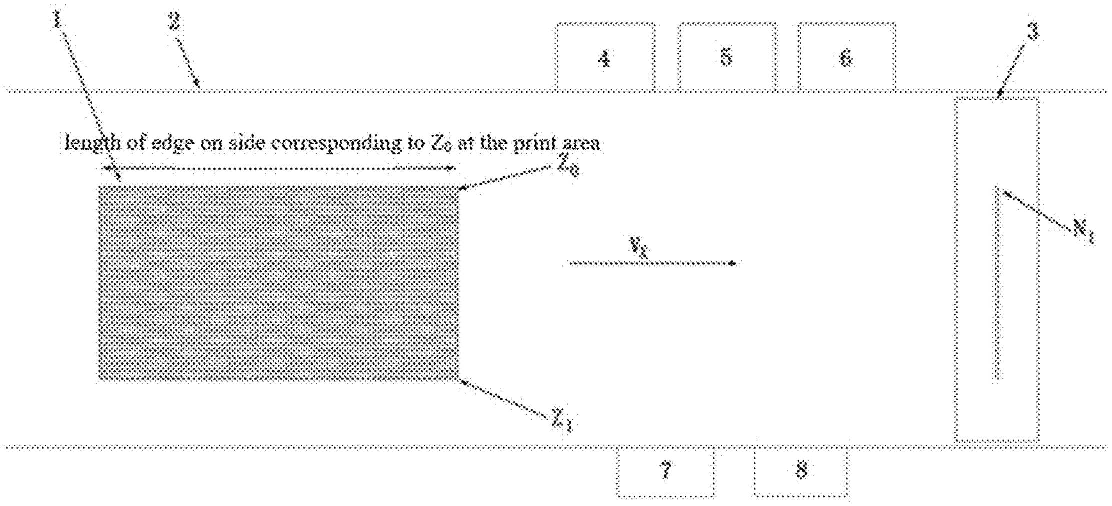
FIG. 1 is a schematic diagram of printing on the untilted print medium according to embodiments 1 and 2 of the present invention.
Figure 2:
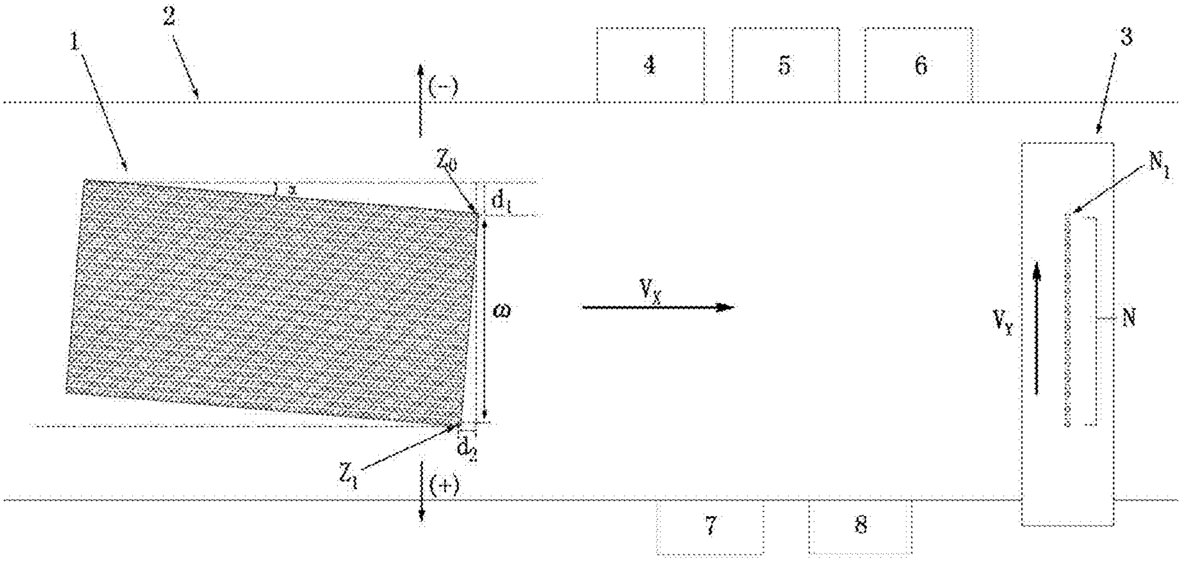
FIG. 2 is a schematic diagram of printing on the tilted print medium according to embodiments 1 and 2 of the present invention.

As shown in FIGS. 1 and 2, a method for printing on a tilted print medium using a printhead is provided according to one embodiment. The print medium 1 placed on a conveyor 2 can be moved at a speed $V_X$ relative to the printhead 3 and is printed during passing through the printhead 3. The printhead 3 forms multi-column linear print points perpendicular to a moving direction of the print medium on the untilted print medium, and the printhead 3 is correspondingly provided with columns of inkjet holes to form the print points. The print point mapped substantially on the tilted print medium is the inkjet position preserved. The print point in this embodiment is represented in the shape of a circle for the sake of ease of representation. The printhead is connected to a tilt detector 4, a translating driver 5, a time delay controller 6, a control device 7, and a distance sensor 8. The translating driver 5 is configured to driver the printhead 3 to translate in a direction perpendicular to the moving direction of print medium 1. The time delay controller 6 is configured to control to delay ink-jetting of the inkjet holes of the printhead 3. The control device 7 includes a print point positioning module consisting of print point positioning modules, and is also used to issue commands to control the translating driver 5 and the time delay controller 6.

Specifically, in this embodiment, the printing medium 1 is a rectangular ceramic tile, and the printing area is the entire top surface of the ceramic tile 1. the method according to the present embodiment includes four Steps.

In Step S1, a tilted direction and a tilted angle $\alpha$ of the tilted print medium 1 relative to the moving direction of the print medium 1 is acquired by the tilt detector 4. As shown in FIG. 2, the tilted direction includes a first direction and a second direction, in which (+) indicates the first direction and (−) indicates the second direction. Specifically, in this embodiment, the tilted angle $\alpha$ is less than or equal to 15°.

In Step S2, according to the known ceramic tile dimensions, the print area which the untilted print medium 1 maps onto the tilted print medium 1 is acquired, wherein the print point closest to printhead 3 in the print area is marked as the start point $Z_0$, and the start point $Z_0$ is acquired by the print point positioning module of the control device 7. Before the printhead 3 prints the start point $Z_0$, the printhead 3 is firstly moved to make that, the inkjet hole $N_1$ which jets ink to the corresponding print point of the untilted print medium 1 corresponding to the start point $Z_0$ matches with the start point $Z_0$ of the tilted print medium in the moving direction, as shown in FIG. 2.

Figure 4:
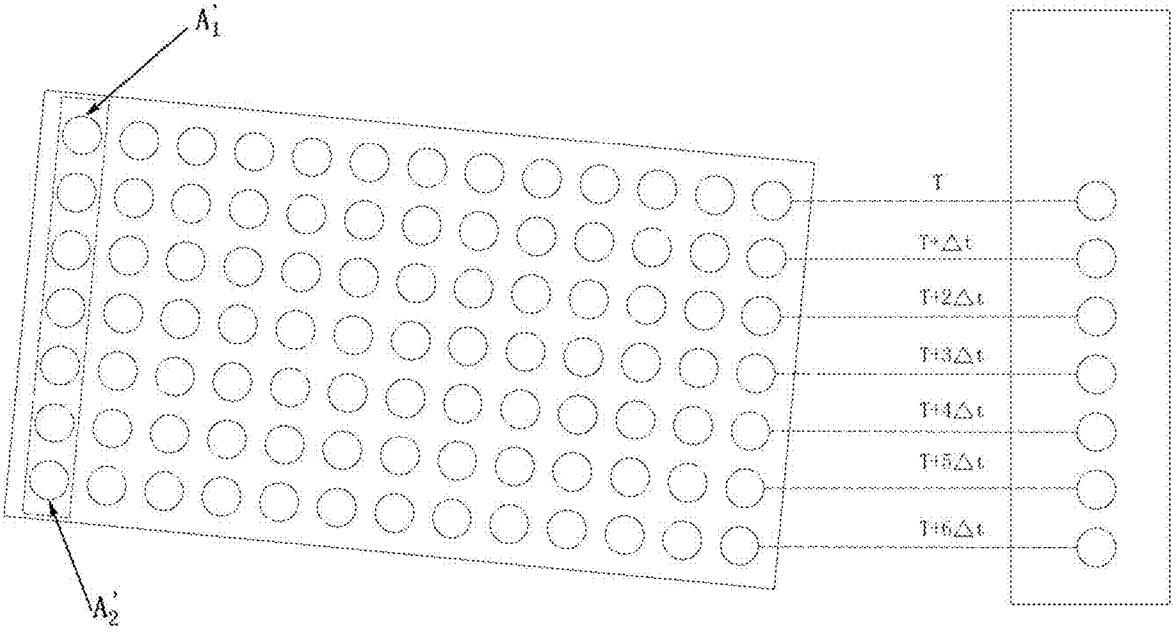
FIG. 4 is a simplified schematic diagram (I) of printing on the tilted print medium according to embodiments 1 and 2 of the present invention.

In Step S3, the time for the print medium to reach the printhead 3 is calculated according to the distance sensor 8, the printhead 3 is started printing from the start point $Z_0$ and is continuously translated at a specific speed $V_Y$, relative to the tilted print medium in a direction perpendicular to the moving direction of the tilted print medium, towards the side opposite to the tilted side of the tilted print medium. As shown in FIG. 2, in this embodiment, the print medium is tilted in the first direction, and the printhead is translated in the second direction opposite to the first direction. During the translation, ink is jetted to the tilted print medium to form that a plurality of inkjet holes in the same column of print points of the untilted print medium jet ink from the inkjet holes closest to the tilted opposite side to the inkjet holes closest to the tilted side with a sequential time delay of $\Delta t$. For illustrative purposes, as shown in FIG. 4, when printing to form the first print point pattern, the subsequent inkjet holes are jetted ink in sequence with a delay following the ink-jetting of $N_1$ at the moment T. Therefore, the second inkjet hole jets ink at the moment $T+\Delta t$, and the third inkjet hole jets ink at the moment $T+2\Delta t$. $\Delta t$ is the time interval of the delayed ink-jetting compared to the previous inkjet hole.

Figure 3:
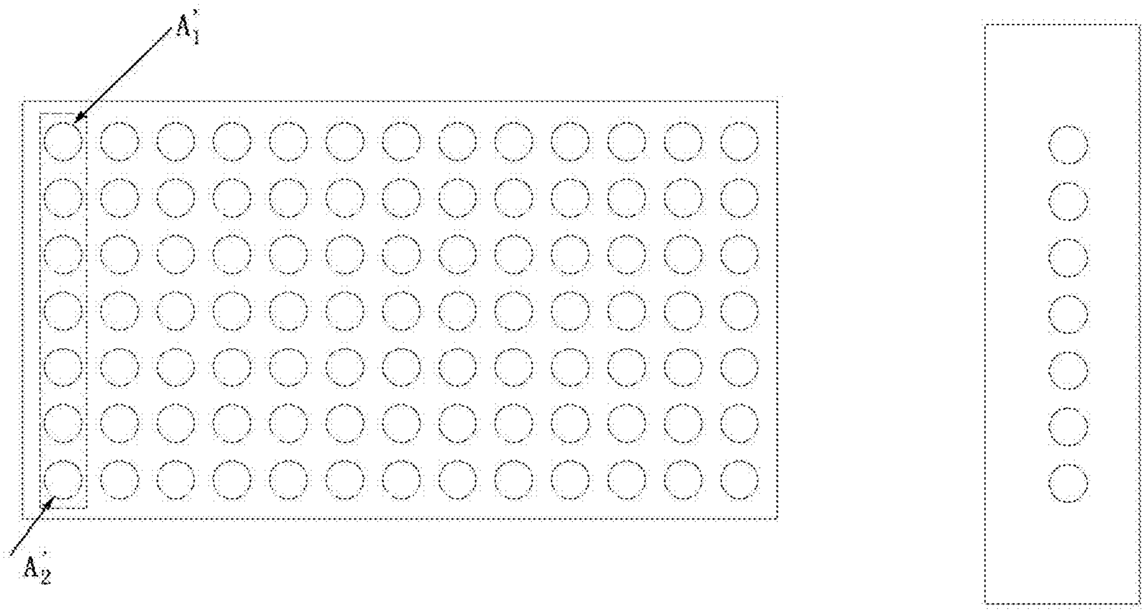
FIG. 3 is a simplified schematic diagram of printing on the untilted print medium according to embodiments 1 and 2 of the present invention.

The print point closest to the printhead in each column of the print points mapping on the tilted print medium is marked as a reference point $A_1$, the reference point in the last column is marked as the final reference point $A_1'$, the print point, which is in the same column as the final reference point $A_1'$ and is farthest from the final reference point, is marked as a tail point $A_2'$. $V_Y$ and $\Delta t$ are set according to $\alpha$. As shown in FIG. 3, in this embodiment at least the following are satisfied: the inkjet holes, which jet ink to the print points of the untilted print medium corresponding to each reference point $A_1$, corresponds to the reference point $A_1$ one by one during the movement of the printhead at speed $V_Y$, thus achieving a precise printing process. The ink-jetting is started from the final reference point $A_1'$ when the printhead moves at speed $V_Y$ to print and form the print point of the column corresponding to the final reference point $A_1$', the ink-jetting, by the remaining inkjet holes that together form the print points of the column corresponding to the final reference point $A_1$', is started from the inkjet hole corresponding to the final reference point $A_1$' with a sequential time delay of Δt, and delayed until that the inkjet hole of the final inkjet corresponds to the tail point $A_2$' before completing the print.

Specifically, in this embodiment, $V_Y$ and Δt may be acquired based on the detected parameters and the known parameters. The print point closest to the printhead in each column of print points mapped on the tilted print medium is acquired and marked as point $A_1$ and the print point farthest from point $A_1$ in the same column as point $A_2$, the distance between the point $A_1$ and point $A_2$ in the direction perpendicular to the moving direction of the tilted print medium is marked as ω. In this embodiment, the print point positioning module and the tilt detector acquires the point $Z_0$ in the first column and the point $Z_1$ in the same column and farthest from the point $Z_0$ incorporating the size of the known ceramic tile, and the number of a column of inkjet holes corresponding to and $$\Delta t = \frac{\omega \sin\alpha}{V_X(N-1)}.$$

In Step S4, a complete pattern on the tilted print medium is formed, and the pattern is not deformed due to the tilted print medium.

Figure 5:
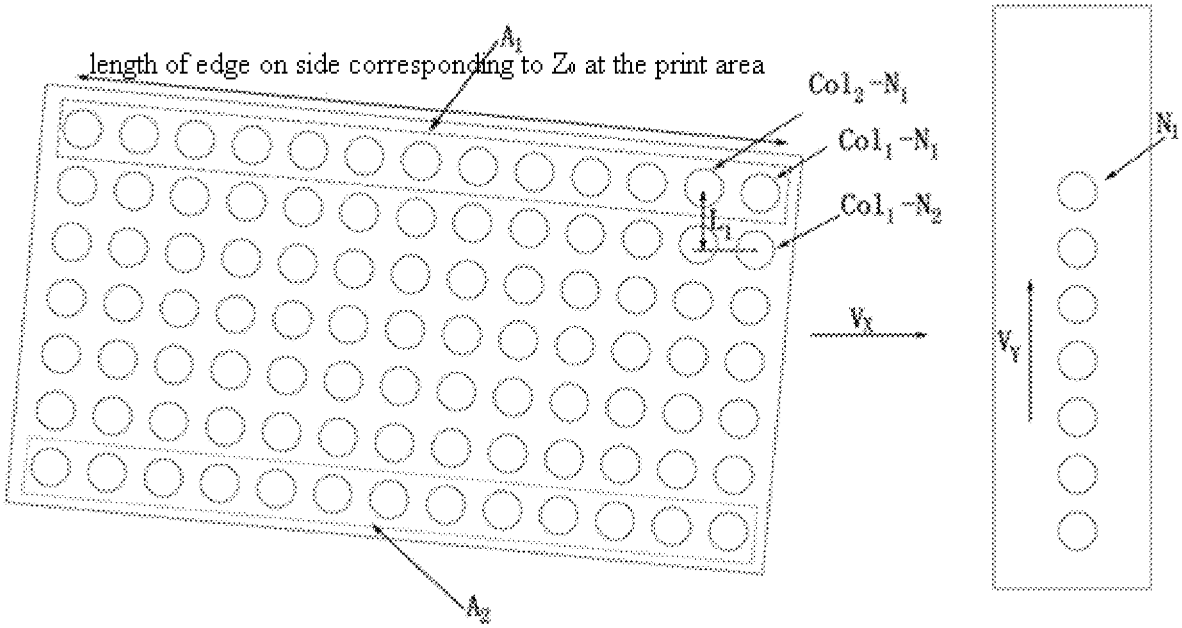
FIG. 5 is another simplified schematic diagram (II) of printing on the tilted print medium according to embodiments 1 and 2 of the present invention.
Figure 6:
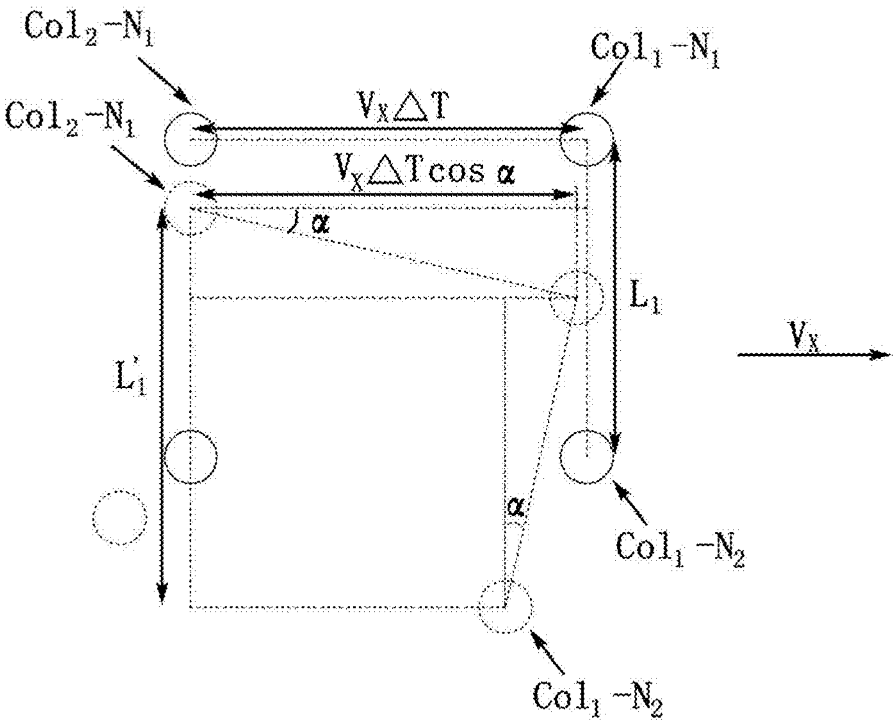
FIG. 6 is a schematic diagram of the geometric relationship of the print points before and after the occurrence of tilting of the print medium according to embodiments 1 and 2 of the present invention.

In addition to the above-mentioned performing the print of the tilted print medium adopting the same arrangement of the inkjet holes which print the untilted print medium, the printhead in this embodiment can include a plurality of columns of inkjet holes with different spacing or spacing between inkjet holes of printhead can be adjustable (not shown in the figure). The spacing between adjacent inkjet holes in a plurality of inkjet holes forming a column of print points on the untilted print medium is marked as $L_1$. The time interval of the print points closest to the printhead in the adjacent column of print points of the tilted print medium printed by the printhead is set as ΔT'=ΔT cos α prior to S3. The spacing of the inkjet holes is selected or is adjusted as $L_1'=V_X \Delta T \sin\alpha+L_1 \cos\alpha$, wherein ΔT is the inkjet interval for printing the print points in adjacent columns of the untilted print medium, and $L_1$ and ΔT are all known. The geometric relationships are specifically shown in FIGS. 5 and 6. For ease of representation, only a small number of print points are shown in FIG. 6, dotted print points are solid print points that map on the print medium after tilted at an angle α. This method allows more accurate reproduction of printing on the untilted print medium.

Referring back to FIGS. 1 and 2, a system for printing on a tilted print medium using a printhead is further provided. The print medium 1 placed on a conveyor 2 and can be moved at a speed $V_X$ relative to the printhead 3 and is printed during passing through the printhead 3. The printhead 3 forms multiple columns of linear and equally spaced print points perpendicular to a moving direction of the print medium on the untilted print medium, and the printhead 3 is correspondingly provided with columns of inkjet holes to form the print points. The print point mapped substantially in the tilted print medium is the inkjet position preserved. The print point in his embodiment is represented in the shape of a circle for easy representation. The printhead 3 is connected to a tilt detector 4, a translating driver 5, a time delay controller 6, a control device 7, and a distance sensor 8. The control device 7 includes a print point positioning module consisting of print point positioning modules. Specifically, in this embodiment, the printing medium 1 is a rectangular ceramic tile, and the printing area is the entire top surface of the ceramic tile 1.

The tilt detector 4 is configured to acquire a tilted direction and a tilted angle α of the tilted print medium 1 relative to the moving direction of the print medium 1. As shown in FIG. 2, the tilted direction includes a first direction and a second direction, in which (+) indicates the first direction and (−) indicates the second direction. Specifically, in this embodiment, the tilted angle α is less than or equal to 15°. The print point positioning module in the control device 7, according on the known ceramic tile dimensions, cooperates with the tilt detector 4 to detect data to compute and acquire the print area which the untilted print medium 1 maps onto the tilted print medium 1, and to position the print point closest to the printhead 3 in the print area as the start point $Z_0$. The control device 7 is configured to driver the printhead by the translating driver 5 to move firstly, before printing the start point $Z_0$, to that, the inkjet hole $N_1$ which jets ink to the corresponding print point of the untilted print medium 1 corresponding to the start point $Z_0$ matches with the start point $Z_0$ of the tilted print medium in the moving direction to, as shown in FIG. 2.

The control device 7 combines the results detected by the tilt detector 4 and the data of the print point positioning module to calculate the time for the print medium to reach the printhead, enabling the printhead to start printing from the start point $Z_0$ and to continuously translate at a specific speed $V_Y$, relative to the tilted print medium in a direction perpendicular to the moving direction of the tilted print medium, towards the tilted opposite side of the tilted print medium. As shown in FIG. 2, in this embodiment, the print medium is tilted towards the first direction, and the printhead is translated towards the second direction opposite to the first direction. During the translation, the control device 7 controls via the time delay controller 6 to jet ink to the tilted print medium to form that a plurality of inkjet holes in the same column of print points of the untilted print medium jet ink from the inkjet holes closest to the tilted opposite side to the inkjet holes closest to the tilted side with a sequential time delay of Δt. For illustrative purposes, as shown in FIG. 4, when printing to form the first print point pattern, the subsequent inkjet holes are jetted ink in sequence with a delay following the ink-jetting of $N_1$ at the moment T. Therefore, the second inkjet hole jets ink at the moment T+Δt, and the third inkjet hole jets ink at the moment T+2Δt. Δt is the time interval of the delayed ink-jetting compared to the previous inkjet hole.

The print point closest to the printhead in each column of the print points mapping on the tilted print medium is marked as a reference point $A_1$, the reference point in the last column is marked as the final reference point $A_1$', the print point, which is in the same column as the final reference point $A_1$' and is farthest from the final reference point, is marked as a tail point $A_2$'. $V_Y$ and Δt are set according to α. As shown in FIG. 3, in this embodiment at least the following are satisfied: the inkjet hole $N_1$, which jets ink to the print points of the untilted print medium corresponding to each reference point $A_1$, corresponds to the reference point $A_1$ one by one during the movement of the printhead at speed $V_Y$, thus achieving a precise printing process. The ink-jetting is started from the final reference point $A_1$' when the printhead moves at speed $V_Y$ to print and form the print point of the column corresponding to the final reference point $A_1$', the ink-jetting, by the remaining inkjet holes that together form the print point of the column corresponding to the final reference point $A_1'$, is started from the inkjet hole corresponding to the final reference point $A_1'$ with a sequential time delay of Δt, and delayed until that the inkjet hole of the final inkjet corresponds to the tail point $A_2'$ before print completion.

Specifically, in this embodiment, $V_Y$ and Δt may be acquired based on a calculation of the detected parameters and the known parameters. The print point closest to the printhead in each column of print points mapped on the tilted print medium is acquired and marked as point $A_1$ and the print point farthest from the point $A_1$ in the same column as point $A_2$, the distance between the point $A_1$ and point $A_2$ in the direction perpendicular to the moving direction of the tilted print medium is marked as ω. In this embodiment, the point $Z_0$ in the first column and the point $Z_1$ in the same column and farthest from the point $Z_0$ are acquired by the print point positioning module and the tilt detector 4 incorporating the size of the known ceramic tile, and the number of a column of inkjet holes corresponding to and forming the same column of print points is marked as N, then $V_Y = V_X \tan\alpha$, $$\Delta t = \frac{\omega \sin\alpha}{V_X(N-1)}.$$

In particular, the printhead in this embodiment can include a plurality of columns of inkjet holes with different spacing or spacing between inkjet holes of printhead can be adjustable (not shown in the figure). The spacing between adjacent inkjet holes in a plurality of inkjet holes forming a column of print points on the untilted print medium is marked as L1. The control device set, based on the data acquired by the tilt detector and the print point positioning module, the time interval of the print points closest to the printhead in the adjacent column of print points of the tilted print medium printed by the printhead as $\Delta T' = \Delta T \cos\alpha$. The spacing of the inkjet holes is selected or is adjusted as $L_1' = V_X \Delta T \sin\alpha + L_1 \cos\alpha$, wherein ΔT is the inkjet interval for printing the print points in adjacent columns of the untilted print medium and L1 and ΔT are all known. Specifically, the geometric relationships are shown in FIGS. 5 and 6. For easy representation, only a small number of print points are shown in FIG. 6, dotted print points are solid print points that map on the print medium after tilted at an angle α. This method allows more accurate reproduction of printing on the untilted print medium.

The printhead continues to translate until the print pattern is completed to print on the tilted print medium, and the pattern is not deformed due to the tilted print medium, achieving the same print effect as on the untilted print medium.

Figure 7:
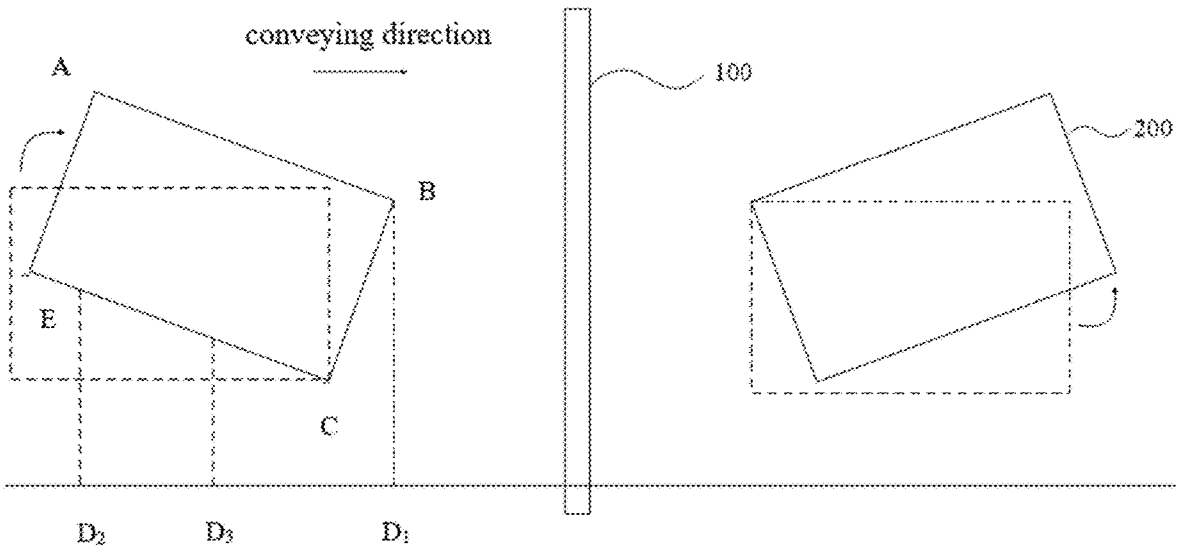
FIG. 7 is a schematic diagram of the overall structure of the printing system according to embodiment 3 of the present invention.

As shown in FIG. 7, a printing system for handling a tilted print medium is provided according to one embodiment, applying to a rectangular print medium ABCE. The tilted direction of the rectangular print medium ABCE is in a clockwise direction, and the system includes a data processing module and a control module.

As shown in FIG. 7, the printing system also involves interaction with a printhead 100 and a print content 200, wherein, the printhead 100 forms a pattern or color on the print medium ABCE according to the preset print content 200. The print content 200 is generally a pattern or design set in the software, however the print content 200 is not an entity. In this embodiment, the print content 200 is embodied in FIG. 7 for illustrative purposes only.

The data processing module is used to acquire a tilted state of the print medium ABCE, the control module is used to adjust the print content 200 according to the tilted state acquired by the data processing module and control the printhead 100 to form a pattern and/or color on the print medium ABCE according to the print content 200.

The specific processing and adjusting Steps of the data processing module and the control module are as follows.

S1: acquiring, by the data processing module, the tilted state of the print medium ABCE, the tilted state including a tilted angle of the print medium ABCE and a position of a print standard point B of the print medium ABCE;

S21: adjusting, by the control module, a print content 200 according to the tilted state of the print medium ABCE acquired by the data processing module in Step S1, to make the print content mirror symmetrical with the print medium ABCE; performing Step S22 when the print standard point B is conveyed to the printhead 100; and

S22: controlling, by the control module, the printhead 100 to start printing on the print medium ABCE according to the print content 200 adjusted according to Step S21 until the printing is completed.

The system provided by this embodiment may cooperate with the control module to adjust the print content corresponding to the tilted print medium after only needs the data processing module to calculate or measure to acquire the tilted state of the print medium, such that the printing of the tilted print medium may be completed smoothly, and the entire adjustment process is non-manual, efficient and cost-effective.

Figure 8:
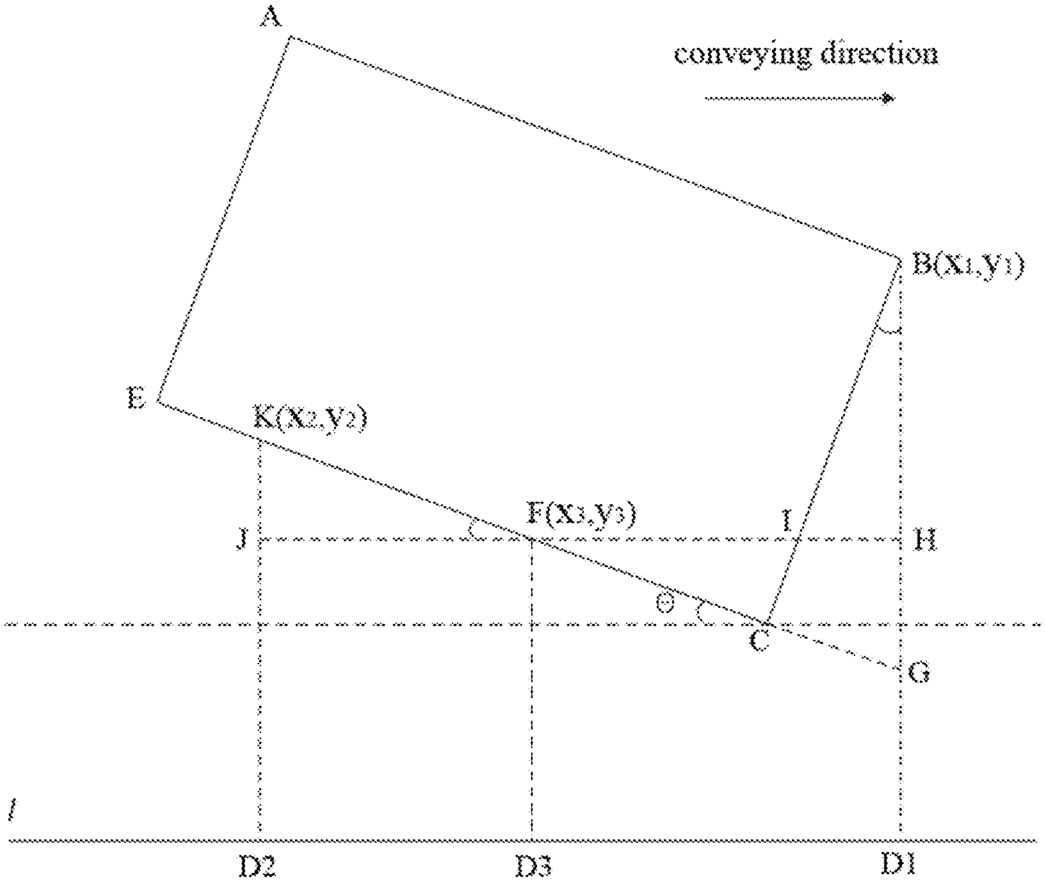
FIG. 8 is a schematic diagram of the structure of the print medium according to embodiment 3 of the present invention.

As a preferred solution, shown in FIG. 8, the tilted angle is θ, which is the angle between the edge CE of the print medium ABCE and a reference line 1, thus, the edge CE is also marked as an angled edge CE, the reference line is a straight line parallel to the direction in which the print medium is conveyed. Furthermore, θ in this embodiment and the following embodiment is the same angle as a of the abovementioned embodiments.

The data processing module includes a data computation module, and a data detection and measurement module. The data detection and measurement module includes an obstruction sensor, a first distance sensor and a second distance sensor. As shown in FIG. 8, the three sensors are all set on the reference line 1, where the obscuration sensor is set at the point $D_1$, the first distance sensor is set at the point $D_2$, and the second distance sensor is set at the point $D_3$. The horizontal coordinates of the points $D_1$, $D_2$ and $D_3$ are $x_1$, $x_2$ and $x_3$ respectively.

The specific execution of Step S1 is as follows.

S11: detecting, by the obstruction sensor, whether the horizontal coordinate of the print standard point B is satisfied with the condition $x_1$ or not; if satisfied, performing Step S12 by the first distance sensor and the second distance sensor;

S12: measuring, by the first distance sensor and the second distance sensor, the vertical distances $y_2$ and $y_3$ to the angled edge at the points $D_2$ and $D_3$ respectively; and

S13: determining, by the data computation module, the tilted angle θ according to the horizontal coordinate $x_2$ of the point $D_2$, the horizontal coordinate $x_3$ of the point $D_3$, $y_2$ and $y_3$ detected in Step S12, and determining the position of the print standard point B according to the horizontal coordinate $x_2$ of the point $D_2$, the horizontal coordinate $x_3$ of the point $D_3$, $y_2$ and $y_3$ detected in Step S12 and the length of the edge BC or edge AE.

The straight line with the points $D_2$ and $D_3$ as endpoints perpendicular to the reference line l has two junction points K and F with the angled edge CE, with none of the junction points overlapping with the two endpoints of the angled edge CE.

The specific execution of Step S1 includes calculating and acquiring the tilted angle θ according to relationship formula $$\tan\theta = \frac{y_2 - y_3}{x_3 - x_2},$$

after determining the tilted angle θ, determining the position of the print standard point after the print medium is tilted according to $$y_1 = \left(y_3 + \frac{b}{\cos\theta}\right) - (x_3 - x_1) \times \tan\theta,$$

where, b is the length of the edge BC or edge AE.

As shown in FIG. 8, It is known that ∠CBG, ∠KFJ and ∠HFG are equal to θ, with the calculation of mathematical geometry, relationship formula $$y_1 = \left(y_3 + \frac{b}{\cos\theta}\right) - (x_3 - x_1) \times \tan\theta$$

is acquired, where, $y_1$ is the vertical height of the print standard point B to the reference line. After calculating $y_1$, the exact position $(x_1, y_1)$ of the print standard point B can be determined based on the horizontal coordinate $x_1$ of the point $D_1$.

Figure 9:
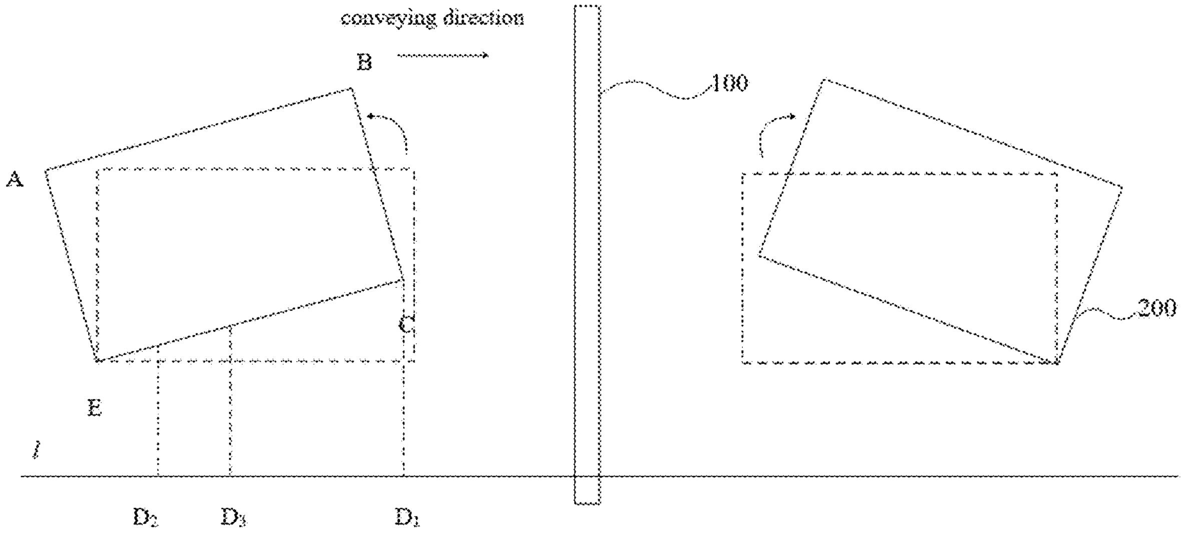
FIG. 9 is a schematic diagram of the overall structure of the printing system according to embodiment 4 of the present invention.

As shown in FIG. 9, a printing system for handling a tilted print medium is provided according to one embodiment, applying to a rectangular print medium ABCE. The tilted direction of the rectangular print medium ABCE is in an anticlockwise direction, and the system includes a data processing module and a control module. As shown in FIG. 9, the printing system also involves interaction with a printhead 100 and a print content 200, wherein, the printhead 100 forms a pattern or color on the print medium ABCE according to the preset print content 200. The print content 200 is generally a pattern or design set in the software, however the print content 200 is not an entity. In this embodiment, the print content 200 is embodied in FIG. 9 for illustrative purposes only.

The data processing module is used to acquire a tilted state of the print medium ABCE, the control module is used to adjust the print content 200 according to the tilted state acquired by the data processing module and control the printhead 100 to form a pattern and/or color on the print medium ABCE according to the print content 200.

The specific processing and adjusting Steps of the data processing module and the control module are as follows.

S1: acquiring, by the data processing module, the tilted state of the print medium ABCE, the tilted state including a tilted angle of the print medium ABCE and a position of a print standard point C of the print medium ABCE;

S21: adjusting, by the control module, a print content 200 according to the tilted state of the print medium ABCE acquired by the data processing module in Step S1, to make the print content mirror symmetrical with the print medium ABCE; performing Step S22 when the print standard point C is conveyed to the printhead 100;

S22: controlling, by the control module, the printhead 100 to start printing on the print medium ABCE according to the print content 200 adjusted according to Step S21 until the printing is completed.

The system provided by this embodiment may cooperate with the control module to adjust the print content corresponding to the tilted print medium after only needs the data processing module to calculate or measure to acquire the tilted state of the print medium, such that the printing of the tilted print medium may be completed smoothly, and the entire adjustment process is non-manual, efficient and cost-effective.

Figure 10:
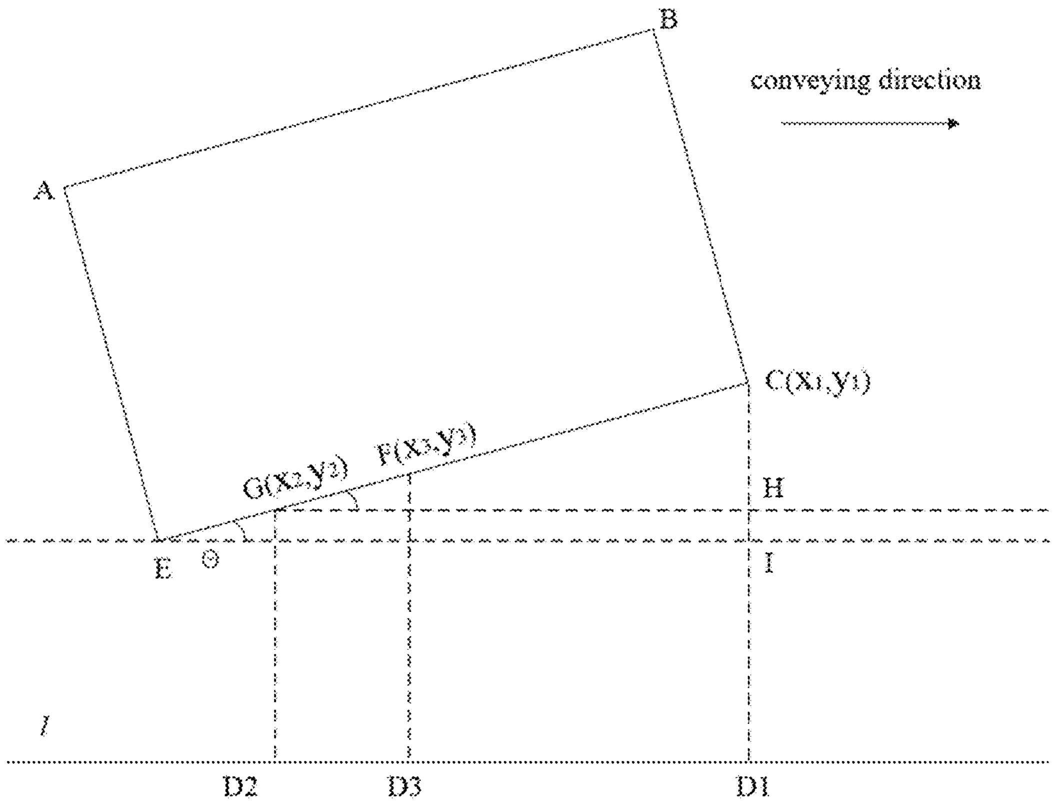
FIG. 10 is a schematic diagram of the structure of the print medium according to embodiment 4 of the present invention.

As a preferred solution, shown in FIG. 10, the tilted angle is θ, which is the angle between the edge CE of the print medium ABCE and a reference line 1, thus, the edge CE is also marked as an angled edge CE, the reference line is a straight line parallel to the direction in which the print medium is conveyed.

The data processing module includes a data computation module, and a data detection and measurement module. The data detection and measurement module includes an obstruction sensor, a first distance sensor and a second distance sensor. As shown in FIG. 10, the three sensors are all set on the reference line 1, where the obscuration sensor is set at the point $D_1$, the first distance sensor is set at the point $D_2$, and the second distance sensor is set at the point $D_3$. The horizontal coordinates of the points $D_1$, $D_2$ and $D_3$ are $x_1$, $x_2$ and $x_3$ respectively.

The specific execution of Step S1 including the following steps.

S11: detecting, by the obstruction sensor, whether the horizontal coordinate of the print standard point C is satisfied with the condition $x_1$ or not; if satisfied, performing Step S12 by the first distance sensor and the second distance sensor;

S12: measuring, by the first distance sensor and the second distance sensor, the vertical distances $y_2$ and $y_3$ to the angled edge at the points $D_2$ and $D_3$, respectively; and

S13: determining, by the data computation module, the tilted angle θ and the position of the print standard point C according to the horizontal coordinate $x_2$ of the point $D_2$, the horizontal coordinate $x_3$ of point the $D_3$, $y_2$ and $y_3$ detected in Step S12.

The straight line with the points $D_2$ and $D_3$ as endpoints perpendicular to the reference line l has two junction points G and F with the angled edge CE, with none of the junction points overlapping with the two endpoints of the angled edge CE.

The specific execution of Step S13 includes calculating and acquiring the tilted angle θ according to relationship formula $$\tan\theta = \frac{y_3 - y_2}{x_3 - x_2},$$

after determining the tilted angle θ, determining the position of the print standard point C after the print medium is tilted according to $y_1=y_2+(x_1-x_2)\times\tan\theta$.

As shown in FIG. 10, it is known that ∠CEI and ∠CGH are equal to θ, with the calculation of mathematical geometry, relationship formula $y_1=y_2+(x_1-x_2)\times\tan\theta$ is acquired, where, $y_1$ is the vertical height of the print standard point C to the reference line. After calculating $y_1$, the exact position $(x_1, y_1)$ of the print standard point C can be determined based on the horizontal coordinate $x_1$ of the point $D_1$.

Obviously, the above embodiments of the present invention are merely illustrative examples for the purpose of clearly illustrating the technical solution of the present invention, and are not intended to limit the embodiments of the present invention in a specific manner. Any modification, equivalent replacement and improvement, etc. made within the spirit and principles of the claims of the present invention shall be included within the scope of protection of the claims of the present invention.

The invention claimed is:

1. A method for printing on a tilted print medium using a printhead, wherein during printing a print medium is moved relative to the printhead and is printed when passing through the printhead, the print medium is referred to as a untilted print medium before it is tilted, and the print medium is referred to as a tilted print medium when it is tilted; multi-column linear print points perpendicular to a moving direction of the print medium are formed on the untilted print medium by the printhead, and the printhead is provided with a plurality of inkjet holes corresponding to the print points, the method comprises steps of:

S1) acquiring a tilted state of the tilted print medium, including a tilted direction and a tilted angle $\alpha$ relative to the moving direction;

S2) acquiring a print start point $Z_0$ on the tilted print medium;

S3) starting print, by the printhead, from the start point $Z_0$ and continuously translating the printhead toward a side of the tilted print medium opposite to a tilted side in a direction perpendicular to the moving direction of the tilted print medium, and controlling one or more inkjet holes to delay jetting ink, according to the tilted state of the tilted print medium, in a direction parallel to the moving direction of the tilted print medium; and S4) forming a complete pattern on the tilted print medium, wherein the complete pattern is not deformed due to the tilted print medium, wherein the tilted print medium is moved relative to the printhead at a speed $V_X$ and is printed as passing through the printhead, in the step S3, the printhead is continuously translated toward the side of the tilted print medium opposite to the tilted side with a speed $V_Y$ relative to the tilted print medium in the direction perpendicular to the moving direction of the tilted print medium, and the plurality of the inkjet holes forming each column of the print points on the tilted print medium are configured to jet ink with a sequential time delay of $\Delta t$ from the side opposite to the tilted side to the other side; and wherein $V_Y$ and $\Delta t$ are set according to $\alpha$, and wherein on the tilted print medium a print point closest to the inkjet head in the last column of the print points corresponding to the untilted print medium is marked as a final reference point $A_1'$, and a print point in the same column farthest from the final reference point is marked as a tail point $A_2'$; in step S3, ink is started to jet from the final reference point $A_1'$ when the printhead is moved at speed $V_Y$ to print and form a column of print points corresponding to the final reference point $A_1'$, the remaining inkjet holes, which together form the column of print points corresponding to the final reference point $A_1'$, is started to jet ink from the inkjet hole corresponding to the final reference point $A_1'$ with a sequential time delay of $\Delta t$, and an inkjet hole which jets ink finally corresponds to the tail point $A_2'$ before completing printing.

2. The method of claim 1, wherein a print point closest to the printhead in each column of print points mapped on the tilted print medium is marked as point $A_1$, and a print point farthest from the point $A_1$ in the same column is marked as point $A_2$, a distance between the point $A_1$ and point $A_2$ in the direction perpendicular to the moving direction of the tilted print medium is marked as $\omega$, and the number of a column of inkjet holes corresponding to each column of print points is N, it is satisfied that $V_Y=V_X \tan\alpha$, $$\Delta t = \frac{\omega\sin\alpha}{V_X(N-1)}.$$

3. The method of claim 2, wherein the printhead is provided with multiple columns of inkjet holes with different spacing or spacing between the adjacent inkjet holes in the printhead is adjustable, the spacing between the adjacent inkjet holes in the plurality of inkjet holes forming each column of the print points on the untilted print medium is marked as $L_1$, a time interval of the print points closest to the printhead in the adjacent column of print points on the tilted print medium printed by the printhead is set as $\Delta T'=\Delta T\cos\alpha$ prior to the step S3, and the spacing of the inkjet holes is selected or the spacing of the inkjet holes is adjusted as $L_1'=V_X\,\Delta T\sin\alpha+L_1\cos\alpha$, wherein the $\Delta T$ is an inkjet interval for printing print points in adjacent columns on the tilted print medium.

4. The method of claim 1, wherein the printhead is translated to the print start point $Z_0$ before printing the print start point $Z_0$ in step S3.

5. The method of claim 1, wherein a print point closest to the printhead in each column of print points on the tilted print medium is marked as a reference point $A_1$, an inkjet hole matched with the reference point $A_1$ corresponds to the reference point $A_1$ one by one during translating the printhead in step S3.

6. The method of claim 1, wherein in step S2, the print start point $Z_0$ mapped on the tilted print medium is acquired according to the tilted angle $\alpha$ of the tilted print medium and a distance of a print area relative to an edge of the untilted print medium, and a point $Z_1$ in the same column as the point $Z_0$ and farthest from the print start point $Z_0$ is acquired.

7. The method of claim 1, wherein a distance between two print points of the multiple print points mapped on the tilted print medium, which is farthest apart in the translating direction of the printhead, is marked as D, the tilted angle of the tilted print medium makes D less than or equal to a width of at least one column of inkjet holes of the printhead in the translating direction.

8. A system for printing on a tilted print medium using a printhead, which is adapted to conduct the method of claim 1, comprising:

a printhead, wherein during printing a print medium is moved relative to the printhead and is printed when passing through the printhead, the print medium is referred to as a untilted print medium before it is tilted, and the print medium is referred to as a tilted print medium when it is tilted; the printhead is provided with a plurality of inkjet holes, the plurality of inkjet holes are configured to print on the untilted print medium to form multi-column linear print points;

a tilt detector, which is configured for detecting parameters indicating a tilted state of the tilted print medium, including a tilted direction and a tilted angle $\alpha$ of the tilted print medium relative to a moving direction of the tilted print medium;

a translating driver, which is configured for driving the printhead to translate in a direction perpendicular to the moving direction of tilted print medium;

a time delay controller, which is configured for controlling the inkjet holes of the printhead to delay jetting ink; and a control device, which includes a print point positioning module for at least acquiring a print start point $Z_0$ for jetting ink on the tilted print medium, wherein the control device is connected to the tilt detector, the translating driver and the time delay controller, the printhead is controlled to translate by the translating driver, and one or more of the inkjet holes in the printhead is controlled to delay jetting ink by the time delay controller.

9. The system of claim 8, wherein the tilted print medium is moved relative to the printhead at a speed $V_X$ and is printed as passing through the printhead, the translating driver is adapted to control the printhead to translate continuously toward the side of the tilted print medium opposite to the tilted side with a speed $V_Y$ relative to the tilted print medium in the direction perpendicular to the moving direction of the tilted print medium, and the plurality of inkjet holes forming each column of the print points on the tilted print medium are configured to jet ink with a sequential time delay of $\Delta t$ from a side opposite to the tilted side to the other side; and wherein $V_Y$ and $\Delta t$ are set according to $\alpha$.

10. The system of claim 9, wherein the print point positioning module, cooperated with the tilt detector which detects data and a distribution of a known print area on the untilted print medium, is adapted to acquire two terminal print points at both ends in each column of print points on the untilted print medium and a distance $\omega$ between the two terminal print points in the direction perpendicular to the moving direction of the print medium, the control device is configured to acquire the number N of inkjet holes to form the corresponding column of print points and set $V_Y=V_X \tan \alpha$ and $$\Delta t = \frac{\omega \sin\alpha}{V_X(N-1)}.$$

11. The system of claim 10, wherein the printhead is provided with multiple columns of inkjet holes with different spacing or spacing between the adjacent inkjet holes in the printhead is adjustable, the spacing between the adjacent inkjet holes in the plurality of inkjet holes forming each column of print points on the untilted print medium is marked as $L_1$, and the control device, according to the data acquired by the tilt detector and the print point positioning module, is configured to set a time interval of the print points closest to the printhead in the adjacent column of print points on the tilted print medium printed by the printhead as $\Delta T'=\Delta T \cos \alpha$, and select the inkjet hole spacing or adjust the inkjet hole spacing as $L_1'=V_X \Delta T \sin \alpha+L_1 \cos \alpha$, wherein the $\Delta T$ is an inkjet interval for printing the print points in adjacent columns on the untilted print medium.

12. The system of claim 8, wherein in the second device module combination, the tilted angle is an angle between one edge of the print medium and a reference line, the one edge of the print medium corresponding to the tilted angle is an angled edge of the print medium; the reference line is a straight line parallel to a direction in which the print medium is conveyed; the data processing module includes a data computing module, and a data detecting and measuring module;

the data processing module is used to determine the tilted angle of the print medium, in a way that:

the data detecting and measuring module is used to detect whether a condition Sc1 is satisfied or not, and when satisfying the condition Sc1, vertical distances $y_2$ and $y_3$ from two points $D_2$ and $D_3$ on the reference line to the angled edge of the print medium, respectively, is measured; and the data computing module is used to determine the tilted angle of the print medium according to a horizontal coordinate $x_2$ of the point $D_2$, a horizontal coordinate $x_3$ of the point $D_3$, the vertical distances $y_2$ and $y_3$.

13. The system of claim 12, wherein the condition Sc1 is that a horizontal coordinate of the print standard point is x1; the print medium is of a rectangular shape;

the data processing module is used to determine the position of the print standard point after tilted, in a way that:

the data computing module is used to determine the position of the print standard point after the print medium is tilted according to $x_1$, $x_2$, $x_3$, $y_2$, $y_3$ and a length of an edge of the print medium perpendicular to the angled edge when the print medium is tilted in a clockwise direction; and the data computing module is also used to determine the position of the print standard point after tilted according to $x_1$, $x_2$, $x_3$, $y_2$, $y_3$ when the print medium is tilted in a counterclockwise direction.

14. The system of claim 8, wherein the print point positioning module is further configured to acquire a print point closest to the printhead on the tilted print medium to take as the print start point $Z_0$ for jetting ink, according to the data detected by the tilt detector and the distribution of the known print area on the untilted print medium.

15. The system of claim 8, wherein the control device is further configured to control the printhead by the translating driver to translate to match with the print start point according to the data acquired by the print point positioning module.

16. The system of claim 8, wherein on the tilted print medium a print point closest to the inkjet head in the last column of the print points corresponding to the untilted print medium is marked as a final reference point $A_1'$, and a print point in the same column farthest from the final reference point is marked as a tail point $A_2'$, the print point positioning module is further configured to acquire the final reference point $A_1'$ and the tail point $A_2'$; the control device is further configured to control the printhead to jet ink from the final reference point $A_1'$ when the printhead is moved at speed $V_Y$ to print and form a column of print points corresponding to the final reference point $A_1'$, and control the remaining inkjet holes, which together form the column of print points corresponding to the final reference point $A_1'$, to jet ink from the inkjet hole corresponding to the final reference point $A_1'$ with a sequential time delay of $\Delta t$, and make an inkjet hole which jets ink finally correspond to the tail point $A_2'$ before completing printing.

17. The system of claim 8, wherein a print point closest to the printhead in each column of print points on the tilted print medium is marked as a reference point $A_1$, the control device is configured to make an inkjet hole matched with the reference point $A_1$ to correspond to the reference point $A_1$ one by one during translating the printhead.

18. The system of claim 8, wherein the print medium is a ceramic tile.

19. The system of claim 8, wherein the print point positioning module is further configured to acquire the print start point $Z_0$ and a print point $Z_1$ in the same column as the point $Z_0$ and farthest from the start point, and a distance between the two points.

20. The system of claim 8, wherein a distance between two print points of the multiple print points mapped on the tilted print medium, which is farthest apart in the translating direction of the printhead, is marked as D, the tilted angle of the tilted print medium makes D less than or equal to a width of at least one column of inkjet holes of the printhead in the translating direction.

21. A method for printing on a tilted print medium using a printhead, wherein during printing a print medium is moved relative to the printhead and is printed when passing through the printhead, the print medium is referred to as a untilted print medium before it is tilted, and the print medium is referred to as a tilted print medium when it is tilted; multi-column linear print points perpendicular to a moving direction of the print medium are formed on the untilted print medium by the printhead, and the printhead is provided with a plurality of inkjet holes corresponding to the print points, the method comprises steps of:

S1) acquiring a tilted state of the tilted print medium, including a tilted direction and a tilted angle α relative to the moving direction;

S2) acquiring a print start point $Z_0$ on the tilted print medium;

S3) starting print, by the printhead, from the start point $Z_0$ and continuously translating the printhead toward a side of the tilted print medium opposite to a tilted side in a direction perpendicular to the moving direction of the tilted print medium, and controlling one or more inkjet holes to delay jetting ink, according to the tilted state of the tilted print medium, in a direction parallel to the moving direction of the tilted print medium; and S4) forming a complete pattern on the tilted print medium, wherein the complete pattern is not deformed due to the tilted print medium, wherein the tilted print medium is moved relative to the printhead at a speed $V_X$ and is printed as passing through the printhead, in the step S3, the printhead is continuously translated toward the side of the tilted print medium opposite to the tilted side with a speed $V_Y$ relative to the tilted print medium in the direction perpendicular to the moving direction of the tilted print medium, and the plurality of the inkjet holes forming each column of the print points on the tilted print medium are configured to jet ink with a sequential time delay of Δt from the side opposite to the tilted side to the other side; and wherein $V_Y$ and Δt are set according to α, wherein a print point closest to the printhead in each column of print points mapped on the tilted print medium is marked as point $A_1$, and a print point farthest from the point $A_1$ in the same column is marked as point $A_2$, a distance between the point $A_1$ and point $A_2$ in the direction perpendicular to the moving direction of the tilted print medium is marked as ω, and the number of a column of inkjet holes corresponding to each column of print points is N, it is satisfied that, $$V_Y = V_X \tan\alpha,\ \Delta t = \frac{-\omega \sin\alpha}{V_X(N-1)},$$

wherein the printhead is provided with multiple columns of inkjet holes with different spacing or spacing between the adjacent inkjet holes in the printhead is adjustable, the spacing between the adjacent inkjet holes in the plurality of inkjet holes forming each column of the print points on the untilted print medium is marked as $L_1$, a time interval of the print points closest to the printhead in the adjacent column of print points on the tilted print medium printed by the printhead is set as $\Delta T' = \Delta T \cos\alpha$ prior to the step S3, and the spacing of the inkjet holes is selected or the spacing of the inkjet holes is adjusted as $L_1 = V_X\ \Delta T \sin\alpha + L_1 \cos\alpha$, wherein the ΔT is an inkjet interval for printing print points in adjacent columns on the untilted print medium.

22. The method of claim 21, wherein on the tilted print medium a print point closest to the inkjet head in the last column of the print points corresponding to the untilted print medium is marked as a final reference point $A_1'$, and a print point in the same column farthest from the final reference point is marked as a tail point $A_2'$; in step S3, ink is started to jet from the final reference point $A_1'$ when the printhead is moved at speed $V_Y$ to print and form a column of print points corresponding to the final reference point $A_1'$, the remaining inkjet holes, which together form the column of print points corresponding to the final reference point $A_1'$, is started to jet ink from the inkjet hole corresponding to the final reference point $A_1'$ with a sequential time delay of Δt, and an inkjet hole which jets ink finally corresponds to the tail point $A_2'$ before completing printing.

* * * * *